US007889951B2

(12) United States Patent
Lippincott

(10) Patent No.: US 7,889,951 B2
(45) Date of Patent: Feb. 15, 2011

(54) PROCESSOR TO PROCESSOR COMMUNICATION IN A DATA DRIVEN ARCHITECTURE

(75) Inventor: Louis A. Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1710 days.

(21) Appl. No.: 10/600,047

(22) Filed: Jun. 19, 2003

(65) Prior Publication Data

US 2005/0018929 A1   Jan. 27, 2005

(51) Int. Cl.
*G06K 9/60* (2006.01)
*G06F 15/00* (2006.01)

(52) U.S. Cl. .......................... 382/303; 382/312; 712/10

(58) Field of Classification Search ................. 382/323, 382/304, 237, 298; 725/134, 152, 142; 209/328; 375/240.16, 240.22; 348/430.1, 581; 345/573, 345/660, 501, 506; 341/60, 63; 712/10, 712/11; 384/232, 304

See application file for complete search history.

(56) References Cited

U.S. PATENT DOCUMENTS

| | | | |
|---|---|---|---|
| 4,065,808 | A | 12/1977 | Schomberg et al. |
| 4,891,751 | A | 1/1990 | Call et al. |
| 4,933,836 | A | 6/1990 | Tulpule et al. |
| 5,689,647 | A | 11/1997 | Miura |
| 6,967,950 | B2 | 11/2005 | Galicki et al. |
| 2003/0208638 | A1 | 11/2003 | Abrams et al. |
| 2005/0001705 | A1 | 1/2005 | Watanabe |
| 2005/0166251 | A1 | 7/2005 | Lippincott |

FOREIGN PATENT DOCUMENTS

| | | | |
|---|---|---|---|
| EP | 0257581 A2 * | 3/1988 |
| EP | 02577581 A2 | 3/1988 |
| EP | 1324604 A2 | 7/2003 |
| WO | WO-99/23817 A1 | 5/1999 |
| WO | WO-2005/067290 A2 | 7/2005 |

OTHER PUBLICATIONS

"International Search Report for corresponding PCT Application No. PCT/US2004/016509", (Nov. 22, 2004),6 pgs.
Brofferio, S., et al., "Performance Evaluation of Image Partitioned Processing on Transputer Network", *Proceedings of the IASTED International Symposium*, (Feb. 1989), 183-185.
"U.S. Appl. No. 10/600,048, Final Office Action mailed Apr. 28, 2006", 10 pgs.
"U.S. Appl. No. 10/600,048, Final Office Action mailed Jul. 5, 2007", 9 pgs.

(Continued)

*Primary Examiner*—Duy M Dang
(74) *Attorney, Agent, or Firm*—Laleh Jalali

(57) ABSTRACT

In an embodiment, an apparatus includes a first processor that includes a first processor element. The apparatus also includes a second processor that includes a second processor element. The first processor is configured to transmit data to the second processor through a third processor, wherein no processor element within the third processor is configured to perform a process operation on the data as part of the transmission of the data from the first processor to the second processor.

19 Claims, 25 Drawing Sheets

OTHER PUBLICATIONS

"U.S. Appl. No. 10/600,048, Non-Final Office Action mailed Apr. 17, 2008", 12 pgs.

"U.S. Appl. No. 10/600,048, Non-Final Office Action mailed Sep. 2, 2005", 10 pgs.

"U.S. Appl. No. 10/600,048, Non-Final Office Action mailed Oct. 16, 2006", 8 pgs.

"U.S. Appl. No. 10/600,048, Response filed Apr. 16, 2007 to Non-Final Office Action mailed Oct. 16, 2006", 12 pgs.

"U.S. Appl. No. 10/600,048, Response filed May 31, 2005", 14 pgs.

"U.S. Appl. No. 10/600,048, Response filed Jun. 28, 2006 to Final Office Action mailed Apr. 28, 2006", 14 pgs.

"U.S. Appl. No. 10/600,048, Response filed Feb. 2, 2006 to Non-Final Office Action mailed Sep. 2, 2005", 21 pgs.

"U.S. Appl. No. 11/175,018, Appeal Brief mailed Apr. 17, 2009", 16 pgs.

"European Application Serial No. 04753352.6, Office Action mailed Aug. 19, 2008", 5 pgs.

Brofferio, S., et al., "Performance evaluation of image partitioned processing on transputer network", *Proceedings of the IASTED International Symposium. Applied Informatics - AI '89*, (1989), 183-5.

\* cited by examiner

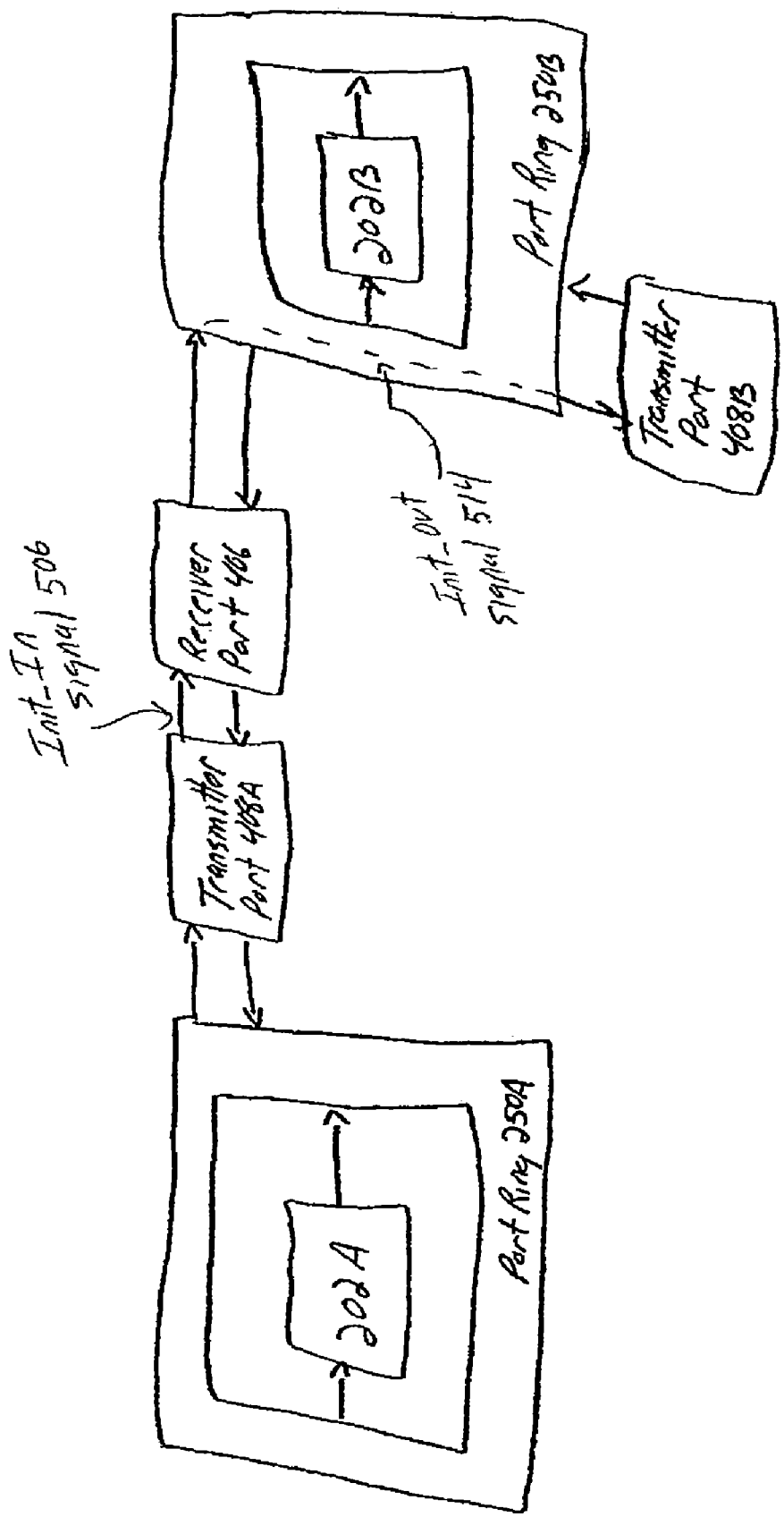

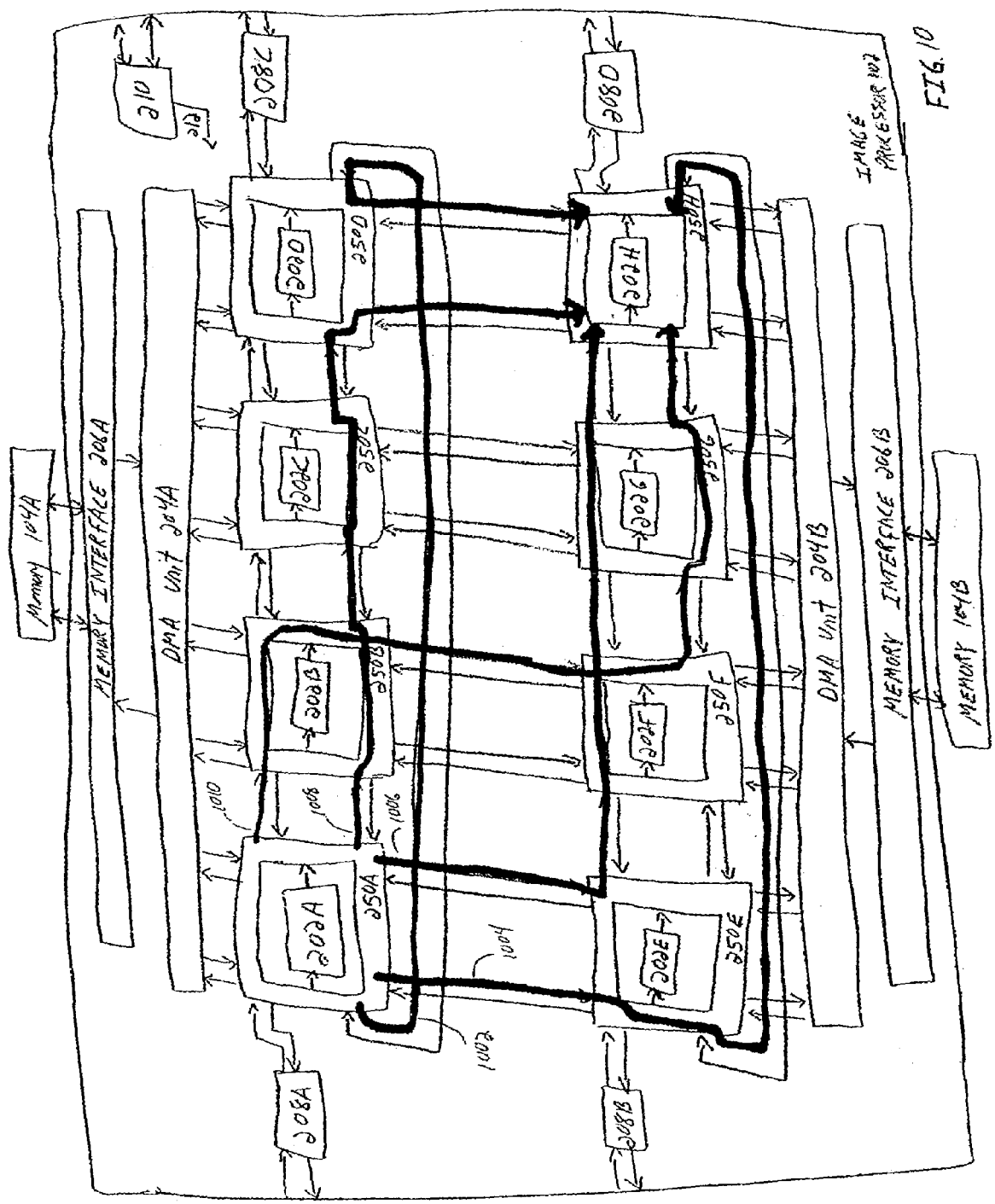

PROCESSOR TO PROCESSOR COMMUNICATION IN A DATA DRIVEN ARCHITECTURE

TECHNICAL FIELD

This invention relates generally to electronic data processing and more particularly, to a processor to processor communication in a data driven architecture.

BACKGROUND

Image processing is becoming increasingly more important and utilized as data (such as word processing documents, pictorial images, etc.) is being scanned and/or stored in various electronic mediums. Image processing for document imaging applications is traditionally handled by fixed-function Application Specific Integrated Circuits (ASICs). In particular, programmable approaches (e.g., Field Programmable Gate Arrays (FPGAs), Digital Signal Processors (DSPs), etc.) have not offered the price/performance required for these applications. Moreover, the lack of scalable approaches meant that the products across the different performance segments could not be standardized on a common platform.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIGS. 7A-7G illustrate a more detailed block diagram of a receiver port communicating with different transmitter ports, according to one embodiment of the invention.

FIG. 10 illustrates a number of different routes for a given logical connection from a source image signal processor to a destination image signal processor, according to one embodiment of the invention.

DETAILED DESCRIPTION

Figure 1:
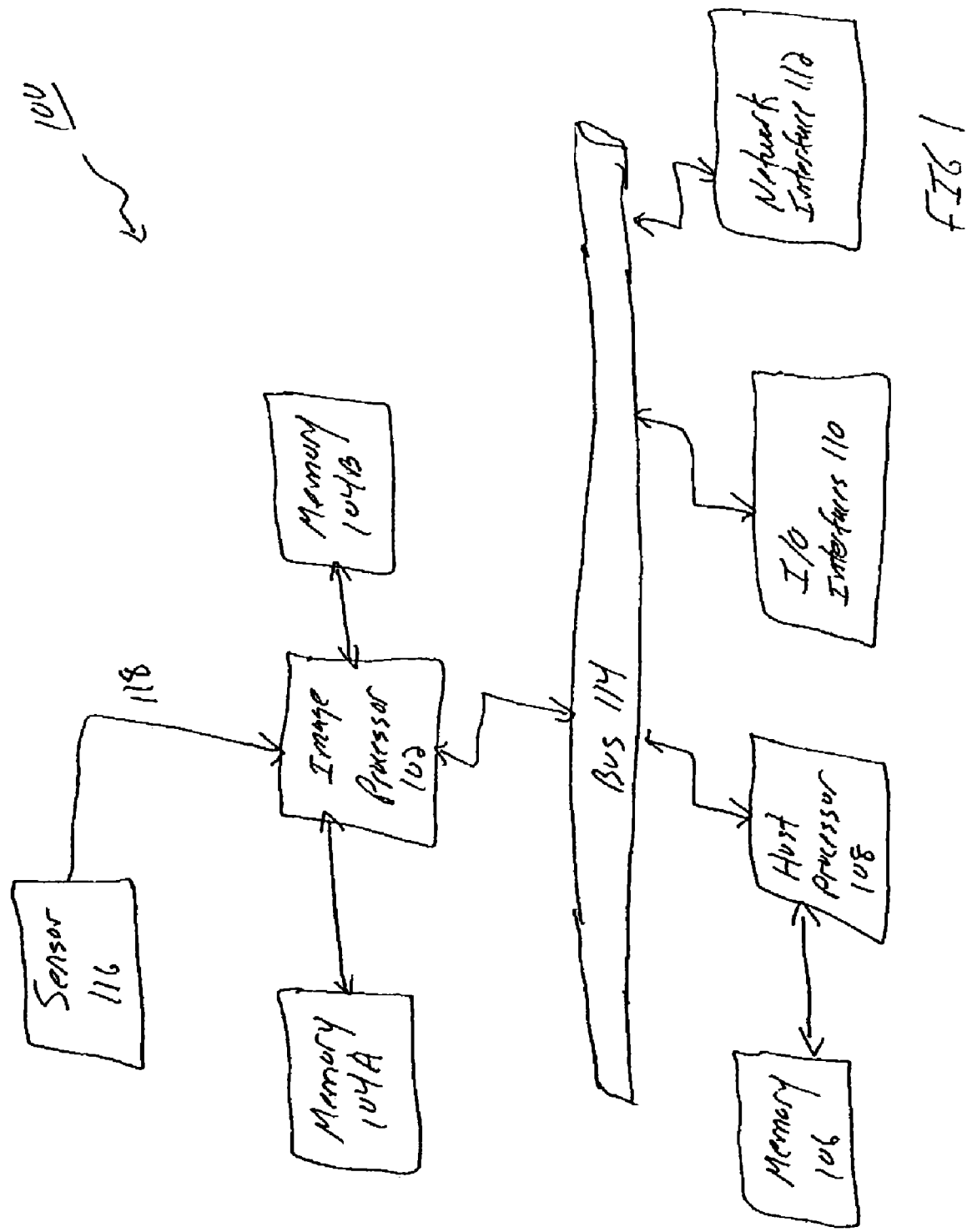
FIG. 1 illustrates a system for processor to processor communication in a data driven architecture, according to one embodiment of the invention.

Methods, apparatuses and systems for processor to processor communication in a data driven architecture are described. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a processor to processor communication in a data driven architecture, in accordance with embodiments of the invention. A number of figures show flow diagrams illustrating operations for a processor to processor communication in a data driven architecture. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

System Description

FIG. 1 illustrates a system for processor to processor communication in a data driven architecture, according to one embodiment of the invention. FIG. 1 illustrates a system 100 that includes an image processor 102 that is coupled to receive an input data stream 118 from a sensor 116. While the sensor 116 may be of different types, in one embodiment, the sensor 116 is a Charge Coupled Device (CCD) sensor. In an embodiment, the sensor 116 is a Complementary Metal Oxide Semiconductor (CMOS) sensor. The sensor 116 scans and digitizes images, thereby producing the input data stream 118. For example, in an embodiment, the system 100 is embedded within a scanner that scans and processes images (such as documents, photos, etc.).

In an embodiment, the image processor 102 has an architecture that is data driven, wherein the transmission and receipt of data across different elements within the image processor 102 drives the execution of the operations therein. In other words, a given operation within an element of the image processor 102 commences when the necessary data is available for execution.

The image processor 102 is coupled to memories 104A-104B. In an embodiment, the memories 104A-104B are different types of random access memory (RAM). For example, the memories 104A-104B are double data rate (DDR) Synchronous Dynamic RAM (SDRAM). As will be described in more detail below, elements within the image processor 102 store data related to image processing into the memories 104A-104B. To illustrate, a processor element within the image processor 102 may store results from a first image processing operation into one of the memories 104A-104B, which is subsequently retrieved by a different processor element within the image processor 102 to perform a second image processing operation.

The image processor 102 is coupled to bus 114, which in an embodiment, may be a Peripheral Component Interface (PCI) bus. The system 100 also includes a memory 106, a host processor 108, a number of input/output (I/O) interfaces 110 and a network interface 112. The host processor 108 is coupled to the memory 106. The memory 106 may be different types of RAM (e.g., Synchronous Dynamic RAM (SDRAM), DRAM, DDR-SDRAM, etc.), while in one embodiment, the host processor 108 may be different types of general purpose processors. The I/O interface 110 provides an interface to I/O devices or peripheral components for the system 100. The I/O interface 110 may comprise any suitable interface controllers to provide for any suitable communication link to different components of the system 100. The I/O interface 110 for one embodiment provides suitable arbitration and buffering for one of a number of interfaces.

For one embodiment, the I/O interface 110 provides an interface to one or more suitable integrated drive electronics (IDE) drives, such as a hard disk drive (HDD) or compact disc read only memory (CD ROM) drive for example, to store data and/or instructions, for example, one or more suitable universal serial bus (USB) devices through one or more USB ports, an audio coder/decoder (codec), and a modem codec. The I/O interface 110 for one embodiment also provides an interface to a keyboard, a mouse, one or more suitable devices, such as a printer for example, through one or more ports. The network interface 112 provides an interface to one or more remote devices over one of a number of communication networks (the Internet, an Intranet network, an Ethernet-based network, etc.).

The host processor 108, the I/O interfaces 110 and the network interface 112 are coupled together with the image processor 102 through the bus 114. As will be further described below, instructions executing within the host processor 108 configures the image processor 102 for different types of image processing. For example, the host processor 108 establishes a number of different logical connections among the different processor elements within the image processor 102. Further, the host processor 108 may download microcode to and check the status of the different components in the image processor 102 therein. To illustrate, a more detailed description of one embodiment of the image processor 102 will now be described.

Image Processor

Figure 2:
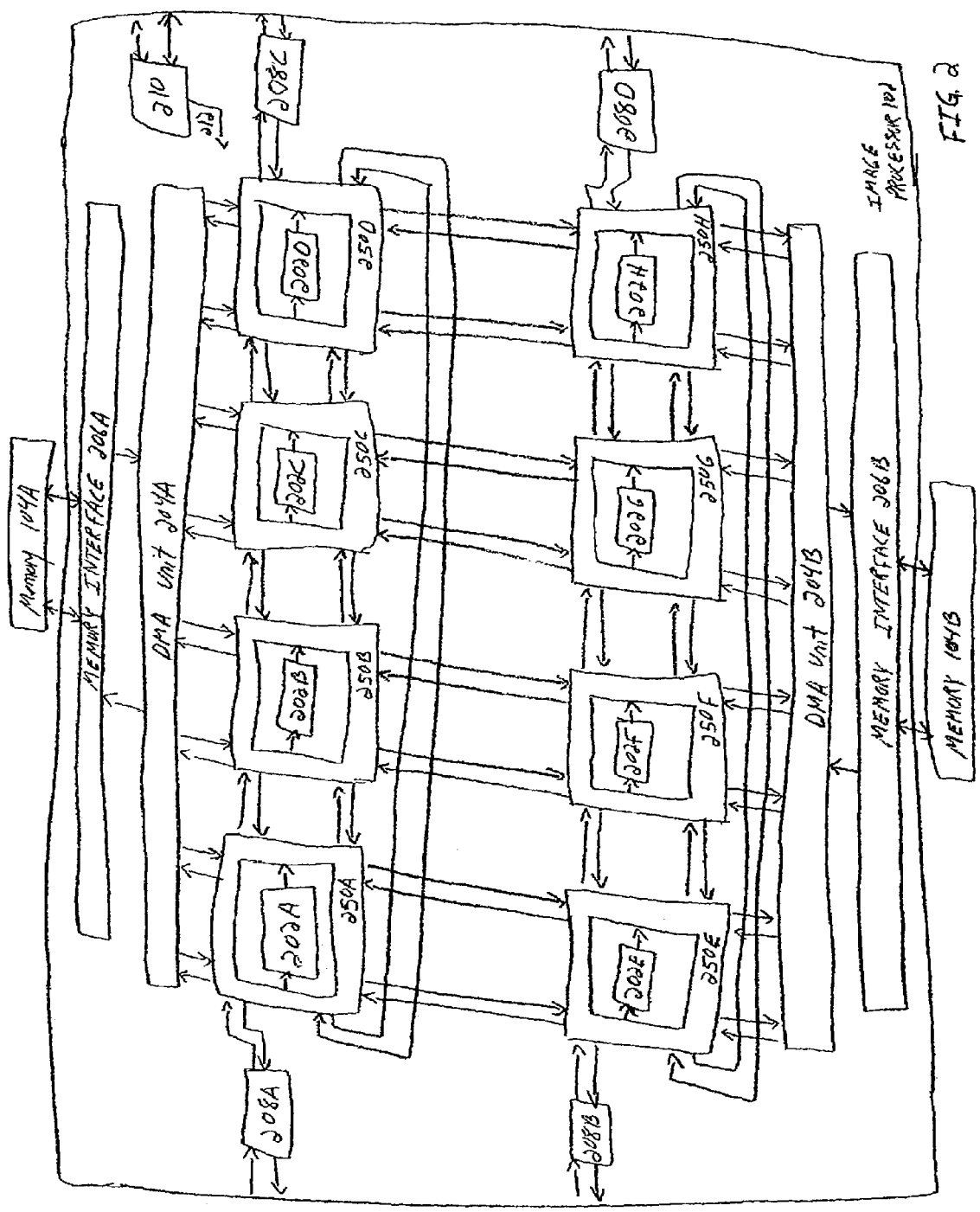
FIG. 2 illustrates a more detailed block diagram of an image processor, according to one embodiment of the invention.

FIG. 2 illustrates a more detailed block diagram of an image processor, according to one embodiment of the invention. In particular, FIG. 2 illustrates a more detailed block diagram of the image processor 102, according to an embodiment of the invention. As shown, the image processor 102 includes image signal processors 202A-202H. The image signal processors 202A-202H include port rings 250A-250H, respectively. As further described below, the port rings 250A-250H includes a number of ports through which the image signal processors 202A-202H transmit interface (control and data) signals. In an embodiment, a given port ring 250 includes eight I/O ports, wherein each such I/O port is a bi-directional connection such that data can be sent and received simultaneously through two separate unidirectional data buses. In other words, an I/O port includes a transmitter port and a receiver port.

The image processor 102 also includes a Direct Memory Access (DMA) unit 204A, a DMA unit 204B, a memory interface 206A and a memory interface 206B. Additionally, the image processor 102 includes an expansion interface 208A, an expansion interface 208B, an expansion interface 208C and an expansion interface 208D. The image processor 102 includes a bus/Joint Test Access Group (JTAG) interface 210. While FIG. 2 illustrates eight image signal processors 202, four expansion interfaces 208, two DMA units 204 and two memory interfaces 206, embodiments are not so limited, as a greater and/or a lesser number of such elements may be incorporated into embodiments of the image processor 102.

As shown, the interconnections among the image signal processors 202A-202H provides for a point-to-point nearest neighbor configuration, wherein a given image signal processor 202 is physically connected to four other elements (e.g., a different image signal processor 202, one of the expansion interfaces 208, one of the DMA units 204) within the image processor 102. In other words, a given image signal processor 204 is not physically connected to every other image signal processor 204 within the image processor 102. As further described below, data may be transmitted from a source image signal processor 202 to a destination image signal processor 202 through a series of intermediate image signal processors 202. In an embodiment, the transmission through the series of intermediate image signal processors 202 is such that the data is received on a receiver port of the intermediate image signal processor 202 and is outputted on a transmitter port of the intermediate image signal processor 202 through the port ring 250. Accordingly, no processor elements within the intermediate image signal processor 202 perform a process operation on the data as part of the transmission of the data from the source to the destination image signal processor 202.

Through the port ring 250A, the image signal processor 202A is coupled to the expansion interface 208A through one I/O port and is coupled to the port ring 250D of the image signal processor 202D through a different I/O port. Through the port ring 250A, the image signal processor 202A is coupled to the DMA unit 204A through two other different I/O ports. Through the port ring 250A, the image signal processor 202A is also coupled to the port ring 250B of the image signal processor 202B through two more different I/O ports. Further, through the port ring 250A, the image signal processor 202A is coupled to the port ring 250E of the image signal processor 202E through two other I/O ports.

Through the port ring 250B, the image signal processor 202B is coupled to the DMA unit 204A through two different I/O ports. Through the port ring 250B, the image signal processor 202B is also coupled to the port ring 250C of the image signal processor 202C through two other different I/O ports. Through the port ring 250B, the image signal processor 202B is coupled to the port ring 250F of the image signal processor 202F through two more different I/O ports.

Through the port ring 250C, the image signal processor 202C is coupled to the DMA unit 204A through two different I/O ports. Through the port ring 250C, the image signal processor 202C is also coupled to the port ring 250D of the image signal processor 202D through two other different I/O ports. Through the port ring 250C, the image signal processor 202C is coupled to the port ring 250G of the image signal processor 202G through two more different I/O ports.

Through the port ring 250D, the image signal processor 202D is coupled to the DMA unit 204A through two different I/O ports. Through the port ring 250D, the image signal processor 202D is also coupled to the expansion interface 208C through one I/O port and is coupled to the port ring 250A of the image signal processor 202A through a different I/O port. Through the port ring 250D, the image signal processor 202D is coupled to the port ring 250H of the image signal processor 202H through two more different I/O ports.

Through the port ring 250E, the image signal processor 202E is coupled to the expansion interface 208B through one I/O port and is coupled to the port ring 250H of the image signal processor 202H through a different I/O port. Through the port ring 250E, the image signal processor 202E is coupled to the DMA unit 204B through two other different I/O ports. Through the port ring 250E, the image signal processor 202E is also coupled to the port ring 250F of the image signal processor 202F through two more different I/O ports. Further, through the port ring 250E, the image signal processor 202E is coupled to the port ring 250A of the image signal processor 202A through two other I/O ports.

Through the port ring 250F, the image signal processor 202F is coupled to the DMA unit 204B through two different I/O ports. Through the port ring 250F, the image signal processor 202F is also coupled to the port ring 250G of the image signal processor 202G through two other different I/O ports. Through the port ring 250F, the image signal processor 202F is coupled to the port ring 250B of the image signal processor 202B through two more different I/O ports.

Through the port ring 250G, the image signal processor 202G is coupled to the DMA unit 204B through two different I/O ports. Through the port ring 250G, the image signal processor 202G is also coupled to the port ring 250H of the image signal processor 202H through two other different I/O ports. Through the port ring 250G, the image signal processor 202G is coupled to the port ring 250C of the image signal processor 202C through two more different I/O ports.

Through the port ring 250H, the image signal processor 202H is coupled to the DMA unit 204B through two different I/O ports. Through the port ring 250H, the image signal processor 202H is also coupled to the expansion interface 208D through one I/O port and is coupled to the port ring 250E of the image signal processor 202E through a different I/O port. Through the port ring 250H, the image signal processor 202H is coupled to the port ring 250D of the image signal processor 202D through two more different I/O ports.

The expansion interfaces 208A-208D may also be externally coupled to different external devices. In an embodiment, the expansion interfaces 208A-208D may be externally coupled to other image processors 102, thereby allowing for the expansion of the number of image signal processors 202 that can communicate and process image data together. In one embodiment, a number of the image processors 102 may be daisy-chained together to allow for the processing of data across a number of different image processors 102. One such embodiment is described in more detail below in conjunction with FIG. 14.

In one embodiment, the input data bus from the expansion interface 208A into the image signal processor 202A is 16 bits wide, while the associated output bus between the expansion interface 208A and the image signal processor 202A as well as the input/output data buses between the expansion interfaces 208B-208D and the image signal processors 202D, 202E and 202H, respectively, are eight bits wide. In such an embodiment, the expansion interface 208A can be used to received data from the sensor 116 and to input such data into the image signal processor 202A using a comparatively larger width data bus. Also, as shown, the expansion interface 208D is coupled to the DMA unit 204B.

The DMA unit 204A is coupled to the memory interface 206A. The memory interface 206A is coupled to the memory 104A. The DMA unit 204B is coupled to the memory interface 206B. The memory interface 206B is coupled to the memory 104B. As will be described in more detail below, data (such as output from a result of an image process operation from one of the image signal processors 202) can be stored into and read from the memories 104A-104B through the DMA units 204A-204B and memory interface 206A-206B, respectively.

The bus/JTAG interface 210 may be externally coupled to the bus 114 to allow for communication/testing of the image processor 102. For example, the host processor 108 may configure the image processor 102 through the bus/JTAG interface 210. Moreover, the bus/JTAG interface 210 is coupled to an internal global bus 212. Although not shown in FIG. 2, the internal global bus 212 is coupled to the different elements within the image processor 102. Accordingly, external devices (e.g., the host processor 108) may directly communicate with/configure each of the different elements within the image processor 102.

Image Signal Processor

Figure 3:
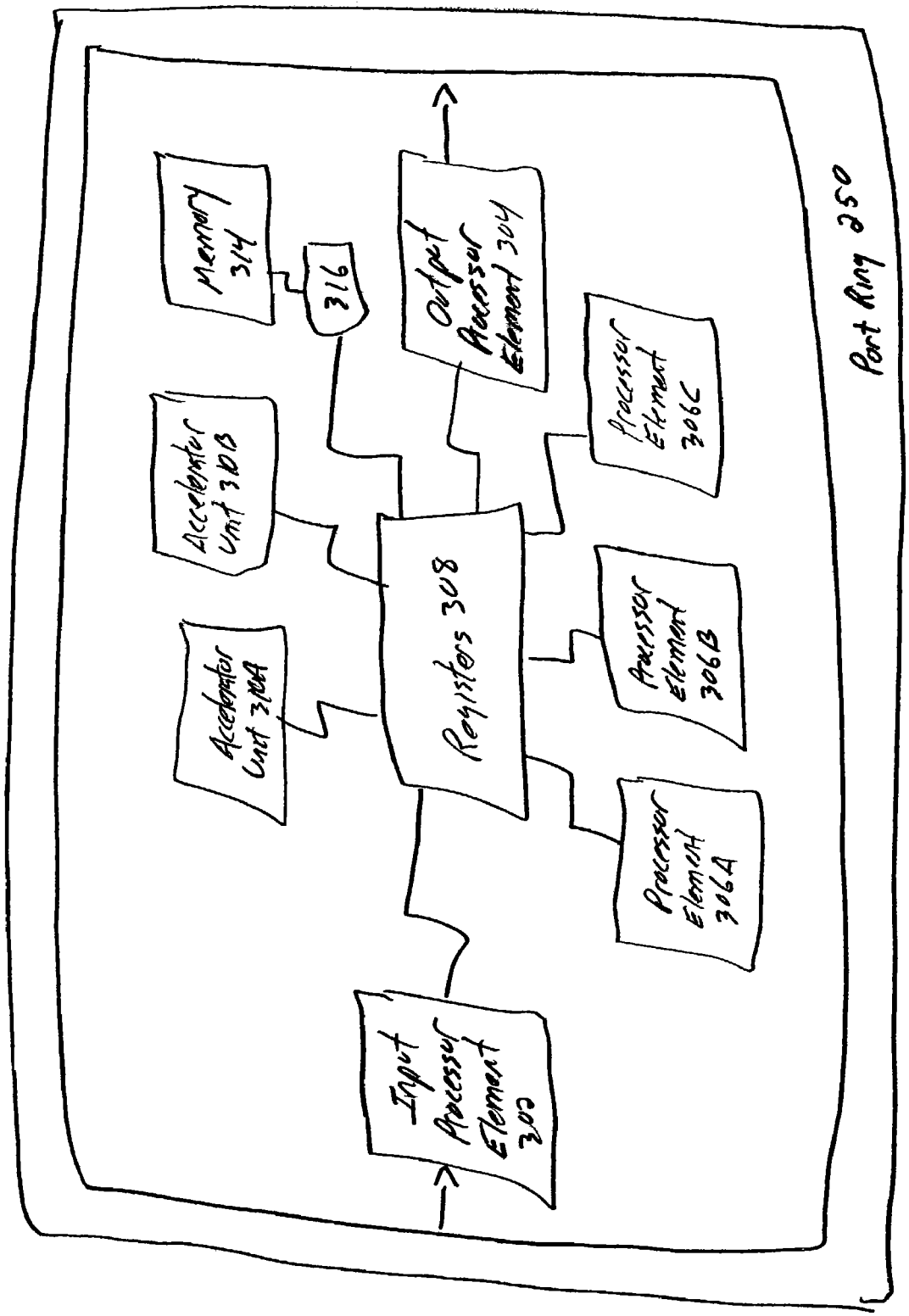
FIG. 3 illustrates a more detailed block diagram of an image signal processor, according to one embodiment of the invention.

FIG. 3 illustrates a more detailed block diagram of an image signal processor, according to one embodiment of the invention. In particular, FIG. 3 illustrates a more detailed block diagram of one of the image signal processors 202, according to one embodiment of the invention.

The image signal processor 202 includes an input processor element 302, an output processor element 304, a number of processor elements 306A-306C, a number of registers 308, a number of accelerator units 310A-310B, a memory 314 and a memory controller 316. The input processor element 302, the output processor element 304, the processor elements 306A-306C, the accelerator units 310A-310B and the memory 314 (through the memory controller 316) are coupled to the registers 308. The registers 308 allow the processor elements 302, 304 and 306, the accelerator units 310A-310B and the memory 314 to exchange data and can be used as general purpose registers for a given processor element 302, 304 and 306 and the accelerator units 310A-310B. Moreover, the processor elements 302, 304 and 306 and the accelerator units 310A-310B may include a number of local registers (not shown).

In an embodiment, the input processor element 302, the output processor element 304 and the processor elements 306A-306C include an instruction memory and an arithmetic-logic unit (ALU) for processing of the data. The input processor element 302 and the output processor element 304 are coupled to the ports of the image signal processor 202 through the port ring 250 to receive data being inputted into and to transmit data being outputted from, respectively, the image signal processor 202 (which is described in more detail below in conjunction with FIG. 4). In addition to inputting and outputting of data, the input processor element 302 and/or the output processor element 304 may process the data (similar to the processing provided by the processor elements 306A-306C). The different processor elements 306A-306C may be general purpose processor elements or special purpose processor elements. For example, the processor elements 306A-306C may be Multiply-Accumulate (MAC) processor elements that include an instruction set for general purpose processing as well as an instruction set for MAC functionality. The processor elements 306A-306C may be a combination of general purpose processor elements and special purpose processor elements. For example, the processor elements 306A and 306C may be MAC processor elements, while the processor elements 306B may be a general purpose processor element. While FIG. 3 illustrates five processor elements within the image signal processor 202, in other embodiments, a lesser or greater number of such processor elements may be incorporated into the image signal processor 202.

The input processor element 302 is a general purpose processor element with a port interface as an input port. In an embodiment, the instructions within the input processor element 302 have the ports as additional input operands along with the registers 308 and the local registers within the input processor element 302. The output processor element 304 is a general purpose processor element with a port interface as an output port. In an embodiment, the instructions within the output processor element 304 have the ports as additional output operands along with the registers 308 and the local registers within the output processor element 304.

Port Ring and Ports of an Image Signal Processor

Figure 4:
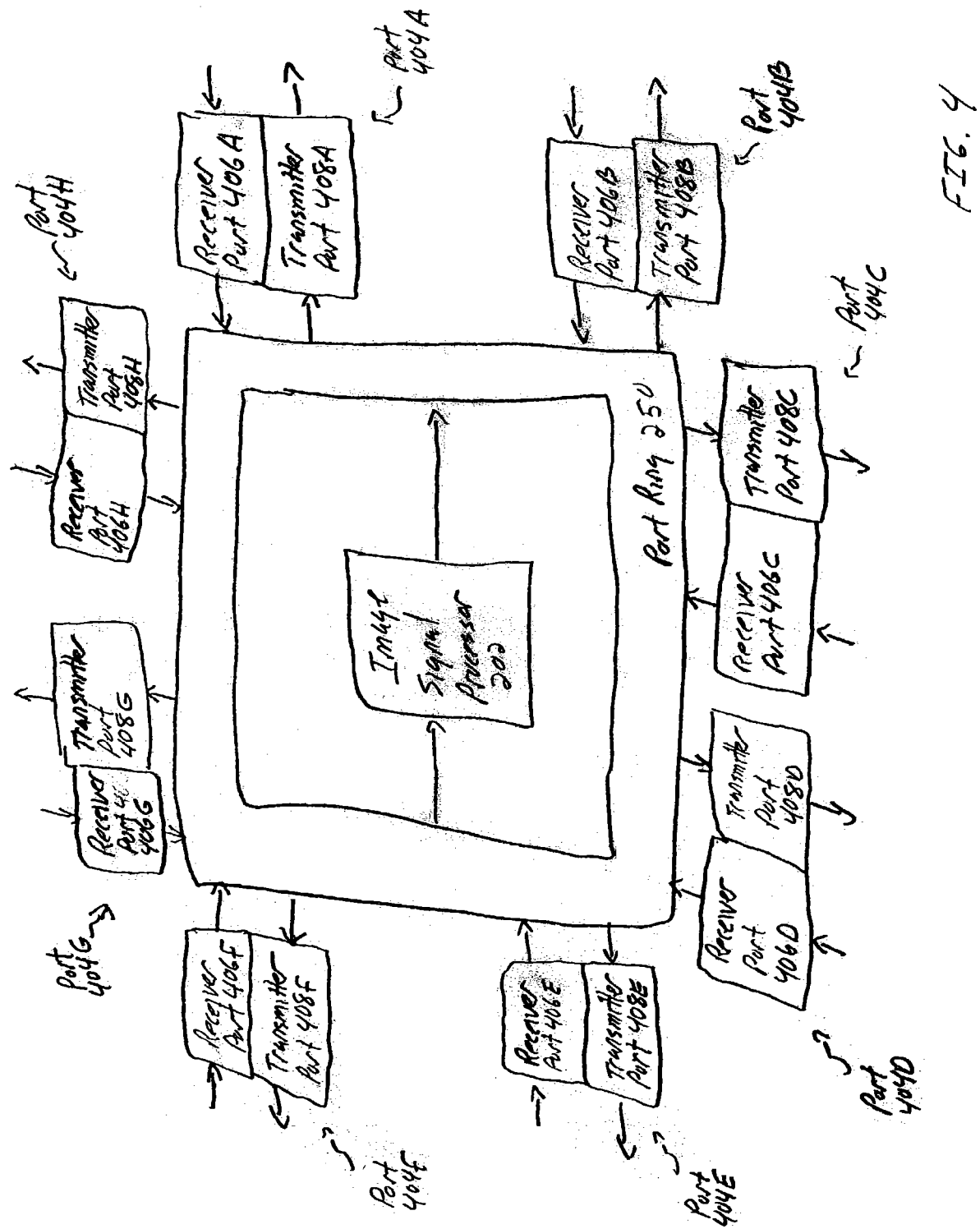
FIG. 4 illustrates a port ring and associated ports of an image signal processor, according to one embodiment of the invention.

FIG. 4 illustrates a port ring and associated ports of an image signal processor, according to one embodiment of the invention. The image signal processor 202 is coupled to input and output data to and from ports 404A-404H through the port ring 250. As shown, in an embodiment, the ports 404A-404H are bi-directional data connections that allow for data to flow from one image signal processor 202 to a different unit (such as a different image signal processor 202, one of the DMA units 204, one of the external interfaces 208).

A given port 404A-404H comprises a receiver port and a transmitter port for receiving data into and transmitting data out from the port 404, respectively. In particular, the ports 404A-404H include receiver ports 406A-406H and transmitter ports 408A-408H, respectively. An embodiment of a receiver port and an embodiment of a transmitter port are described below in conjunction with FIG. 6 and FIG. 7, respectively. In an embodiment, an image signal processor 202 is connected to an adjacent (nearest neighbor) image signal processors 202 (as illustrated in FIG. 2) through the ports 404A-404H.

Figure 5:
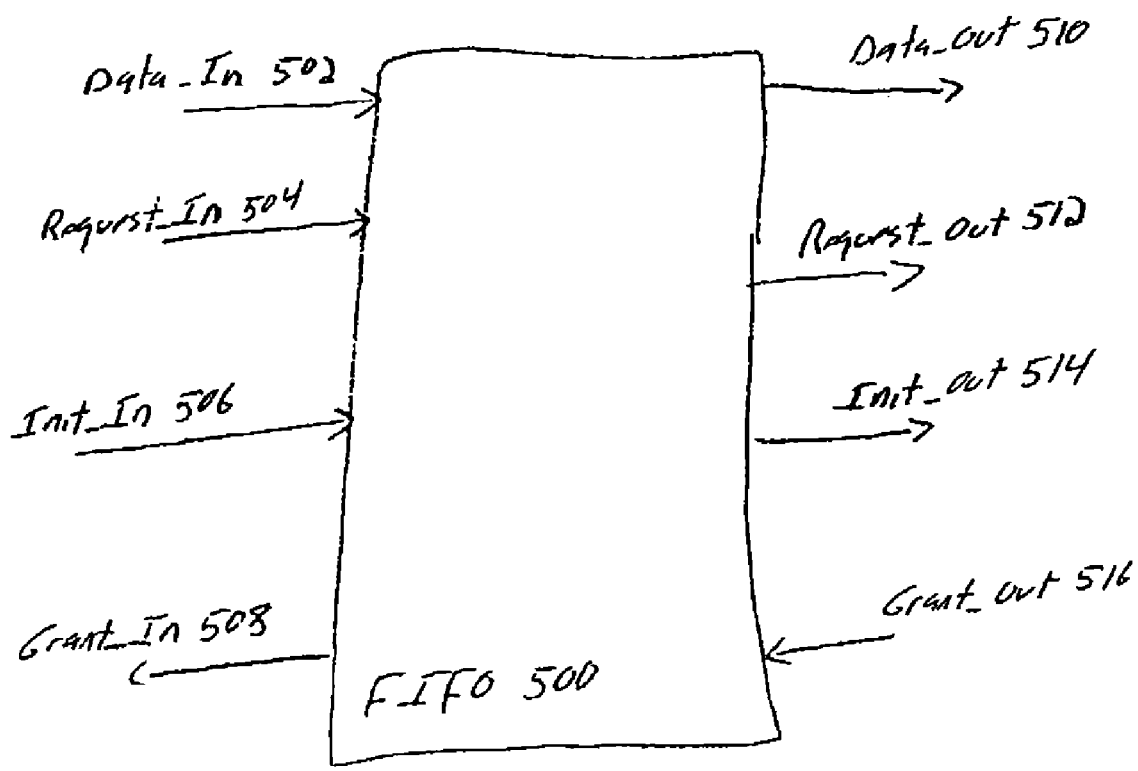
FIG. 5 illustrates a FIFO memory within a transmitter or receiver port and associated interface signals for the memory, according to one embodiment of the invention.

One embodiment of receiver and transmitter port (within one of the ports 404) which includes FIFO memories will now be described. FIG. 5 illustrates a FIFO memory within a transmitter or receiver port and associated interface signals for the memory, according to one embodiment of the invention.

As shown, a FIFO memory 500 receives an init_in signal 506 and transmits an init_out signal 510, which (as described in more detail below) are control signals for initialization and generation of a logical connection that is used to transmit data through the different image signal processors 202. The FIFO memory 500 receives a data_in signal 502 that inputs data into one of the entries of the FIFO memory 500.

The FIFO memory 500 also illustrates a number of grant/request signals. As is further described below, in an embodiment, the ports 404 use a handshake protocol for the transmission of data based on these grant/request signals. Accordingly, this grant/receive protocol allows for a data driven architecture, wherein the image process operations are driven by the data on which such operations execute.

The FIFO memory 500 receives a request_in signal 504, which is a control signal from a FIFO memory in a different port that inputs data into an entry of the FIFO memory 500. The FIFO memory 500 transmits a grant_in signal 508 to this FIFO memory, in response to the request_in signal 504, that indicates that this FIFO memory may transmit data into the FIFO memory 500.

The FIFO memory 500 transmits a request_out signal 512 to a FIFO memory of a different port to request the transmission of data from the FIFO memory 500 to this FIFO memory. The FIFO memory 500 receives a grant_out signal 516 from this FIFO memory, in response to the request_out signal 512. This grant_out signal 516 signals to the FIFO memory 500 that the different FIFO memory will receive data from the FIFO memory 500. The FIFO memory 500 transmits a data_out signal 510 that transmits data to the different FIFO memory that granted transmission of the data (through grant_out signal 516) in response to the request_out signal 512.

Figure 6:
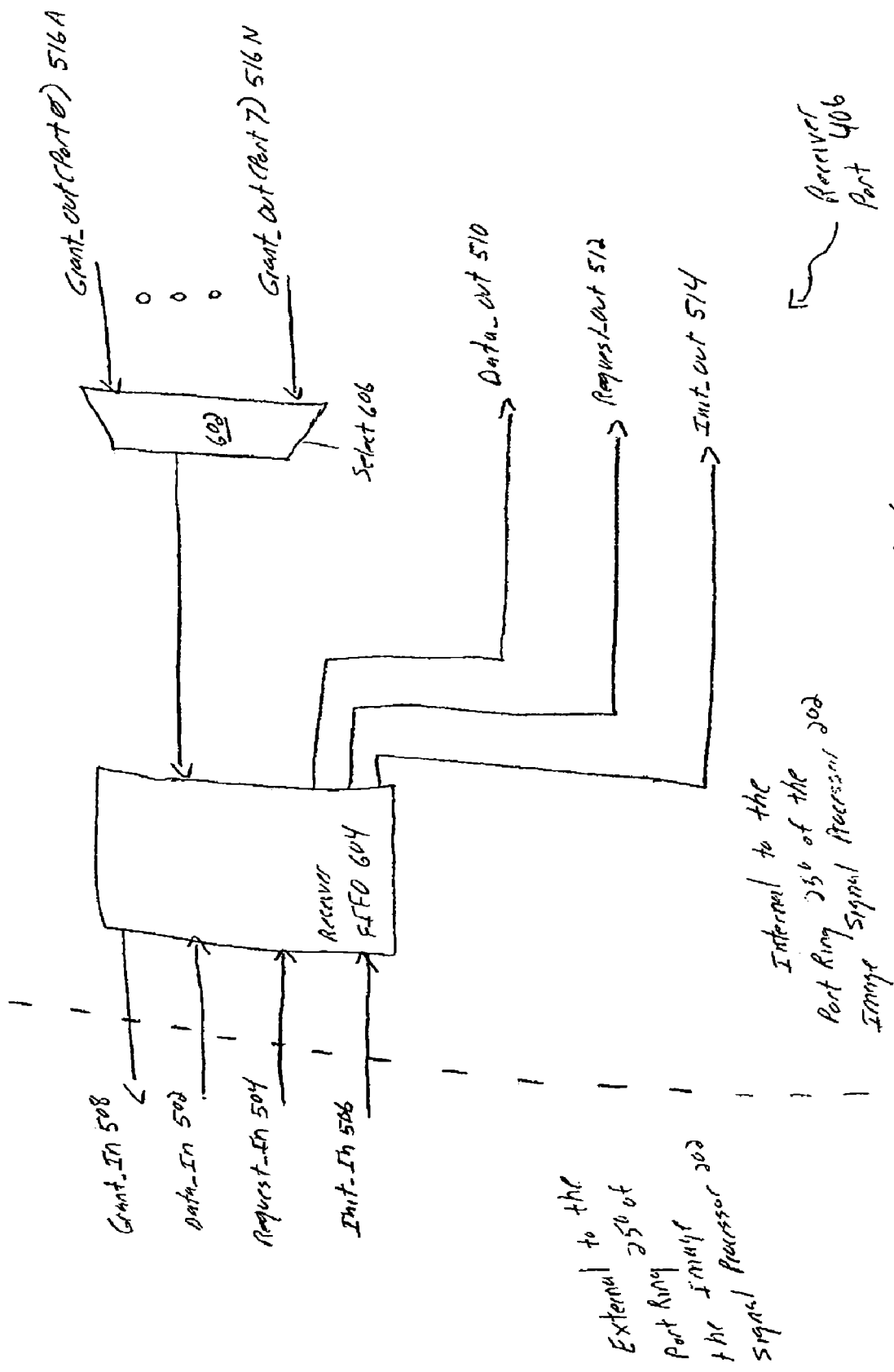
FIG. 6 illustrates a more detailed block diagram of a receiver port along with associated interface signals, according to one embodiment of the invention.

FIG. 6 illustrates a more detailed block diagram of a receiver port along with associated interface signals, according to one embodiment of the invention. In particular, FIG. 6 illustrates one embodiment of a receiver port 406 (that includes a receiver FIFO 604) and associated interface signals. The receiver port 406 is within one of the ports 404 (shown in FIG. 4) and receives data into the image signal processor 202.

The receiver FIFO 604 is coupled to receive and transmit interface signals (the grant_in signal 508, the data_in signal 502, the request_in signal 504 and the init_in signal 506) to and from a transmitter port 408 that is external to the port ring 250 of the image signal processor 202. The receiver FIFO 604 is also coupled to receive and transmit interface signals (a number of grant_out signals 516A-516N, the data_out signal 510, the request_out signal 512 and the init_out signal 514) from transmitter ports 408 that are internal to the port ring 250 of the image signal processor 202 or a processor element within the image signal processor 202. As shown, the grant_out signals 516A-516N are received into a multiplexer 602. The receiver port 406 uses a select signal 606 to cause the multiplexer 602 to select one of the grant_out signals 516A-516N to be inputted into the receiver FIFO 604. As described above, the host processor 108 configures the image processor 102, wherein output from one processor element in an image signal processor 202 may be input to be processed by a different processor element in a different image signal processor 202 through a logical connection. Accordingly, the host processor 108 causes the receiver port 406 to assert the select signal 606 to select the grant_out signal 516 from the appropriate transmitter port 408/input processor element 302.

As described, the output from a first image process operation in a first image signal processor 202 may be forwarded to a second image signal processor 202, wherein a second image process operation is performed. In one embodiment, this output is transmitted through a logical connection that comprises a number of ports 404 of a number of image signal processors 202. In an embodiment, an initialize signal is transmitted through the different ports 404 through which the data is transmitted for a given logical connection. As described above, the architecture of the image processor 102 is such that a given image signal processor 202 is not directly connected to every other image signal processor 202. Rather, an image signal processor 202 is connected to adjacent (nearest neighbor) devices. Therefore, if data is to be transmitted from one image signal processor 202 to another image signal processor 202, a logical connection is established through different ports of the different image signal processors 202 that the data traverses from the source image signal processor 202 to the destination image signal processor 202.

Returning to FIG. 2 to illustrate, assume that the output from a processor element within the image signal processor 202C is to be transmitted to a processor element within the image signal processor 202E for further processing. One of a number of logical connections may be established from the image signal processor 202C to the image signal processor 202E. One example of a logical connection is from the image signal processor 202C to the image signal processor 202B to the image signal processor 202A to the image signal processor 202E. A different example of a logical connection is from the image signal processor 202C to the image signal processor 202G to the image signal processor 202F to the image signal processor 202E. In one embodiment, the host processor 108 determines the selection of the logical connection based on the other active logical connections that may be using the same paths of communication. For example, if other logical connections are using the ports between the image signal processor 202B to the image signal processor 202A, the host processor 108 may select the latter example logical connection to reduce the latency for the data processing operations.

In an embodiment, the port 404 from which the data originates is initialized. This initialization signal will be propagated through the entire logical connection, thereby initializing the data path for this given logical connection. This initialization signal is registered and passed through the different ports 404 as if the initialization signal were the data in order to prevent the propagation delays from accumulating through long logical connections. In an embodiment, this initialization may include flushing of the receiver and transmitter FIFOs that are used in the logical connection. Therefore, if any data is within these FIFOs from a previous logical connection, this initialization causes the data to be deleted therefrom. In an embodiment, these different interface signals are handled in this manner to preclude large combinatorial delays through the logical connections. Therefore, routing between the different image signal processors 202 are processed through point-to-point connections that are registered in the different ports 404 that are part of the logical connection.

Figure 7B:
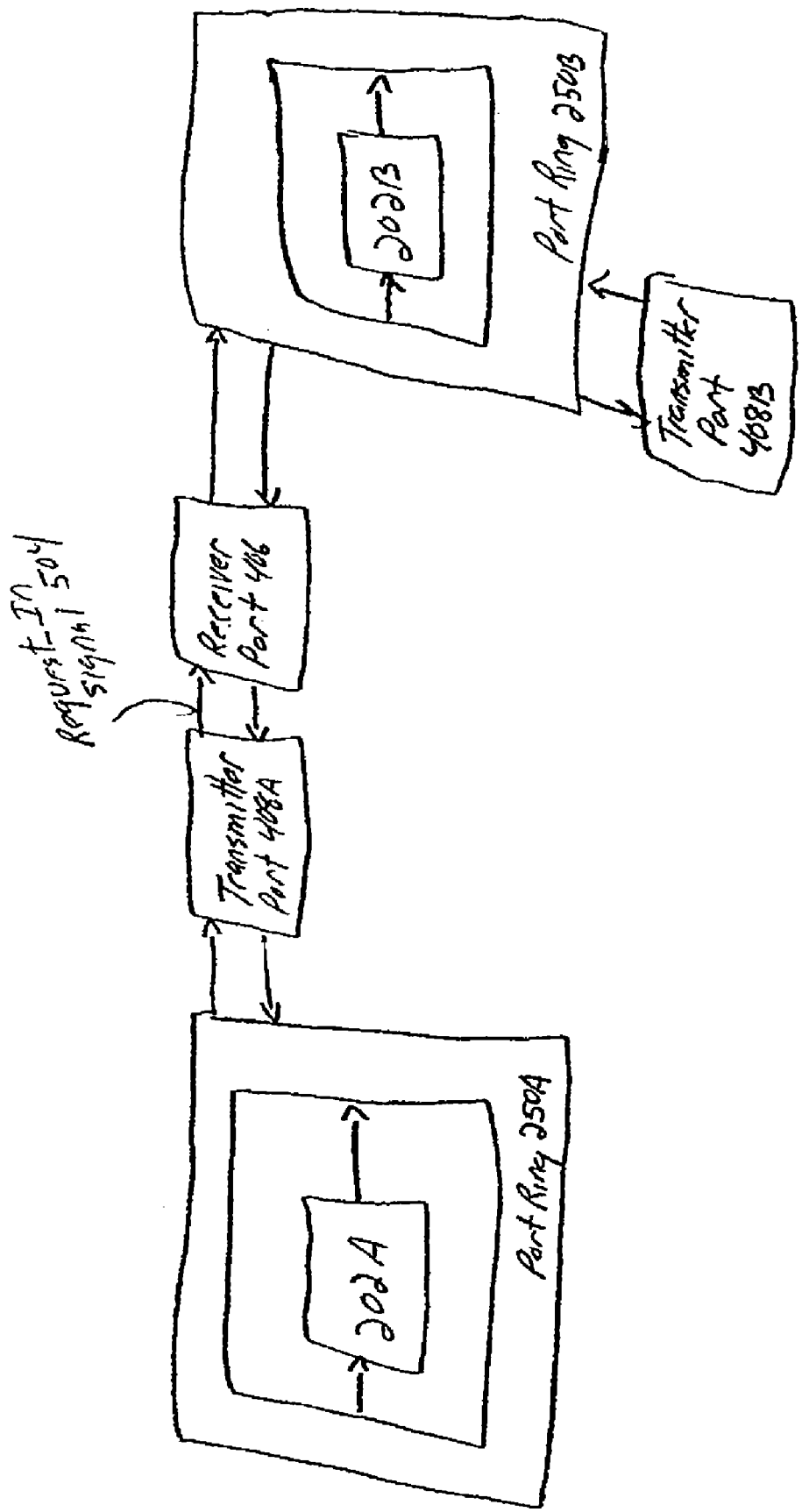
Figure 7C:
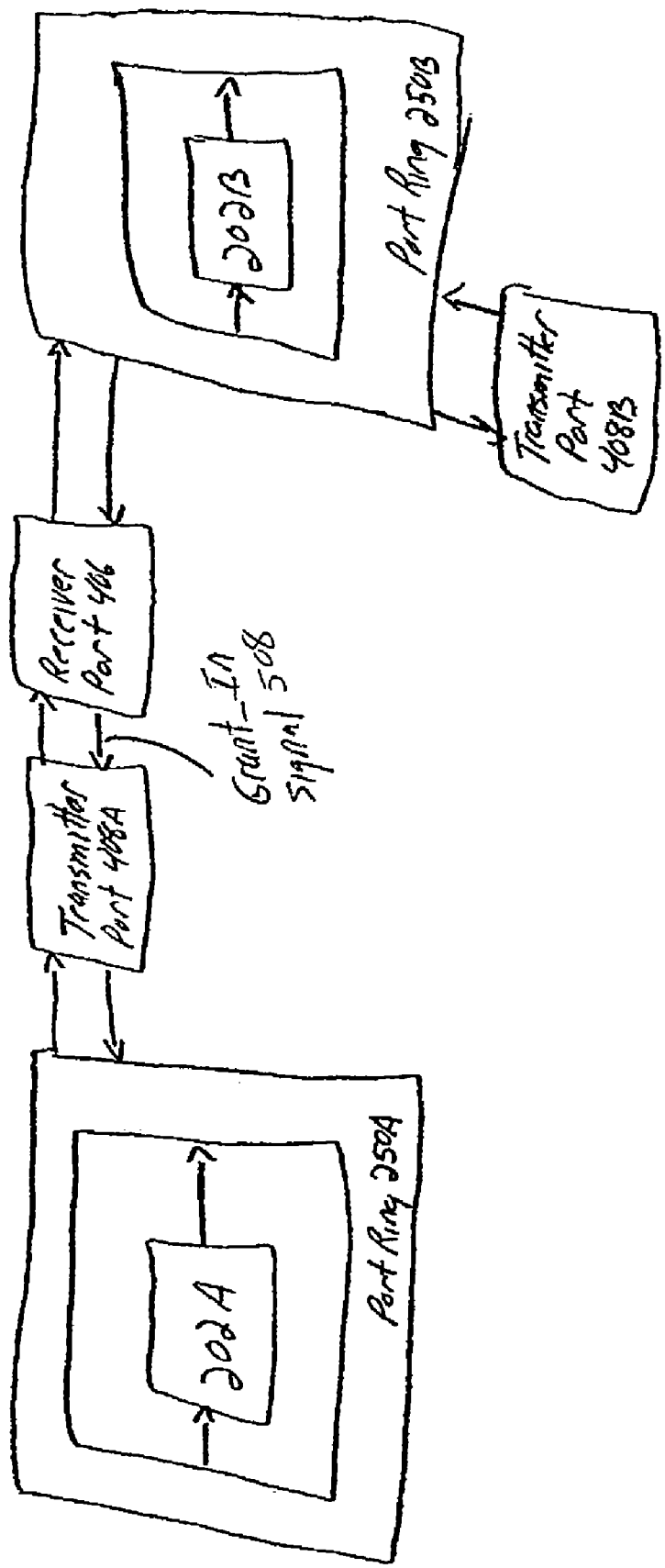
Figure 7D:
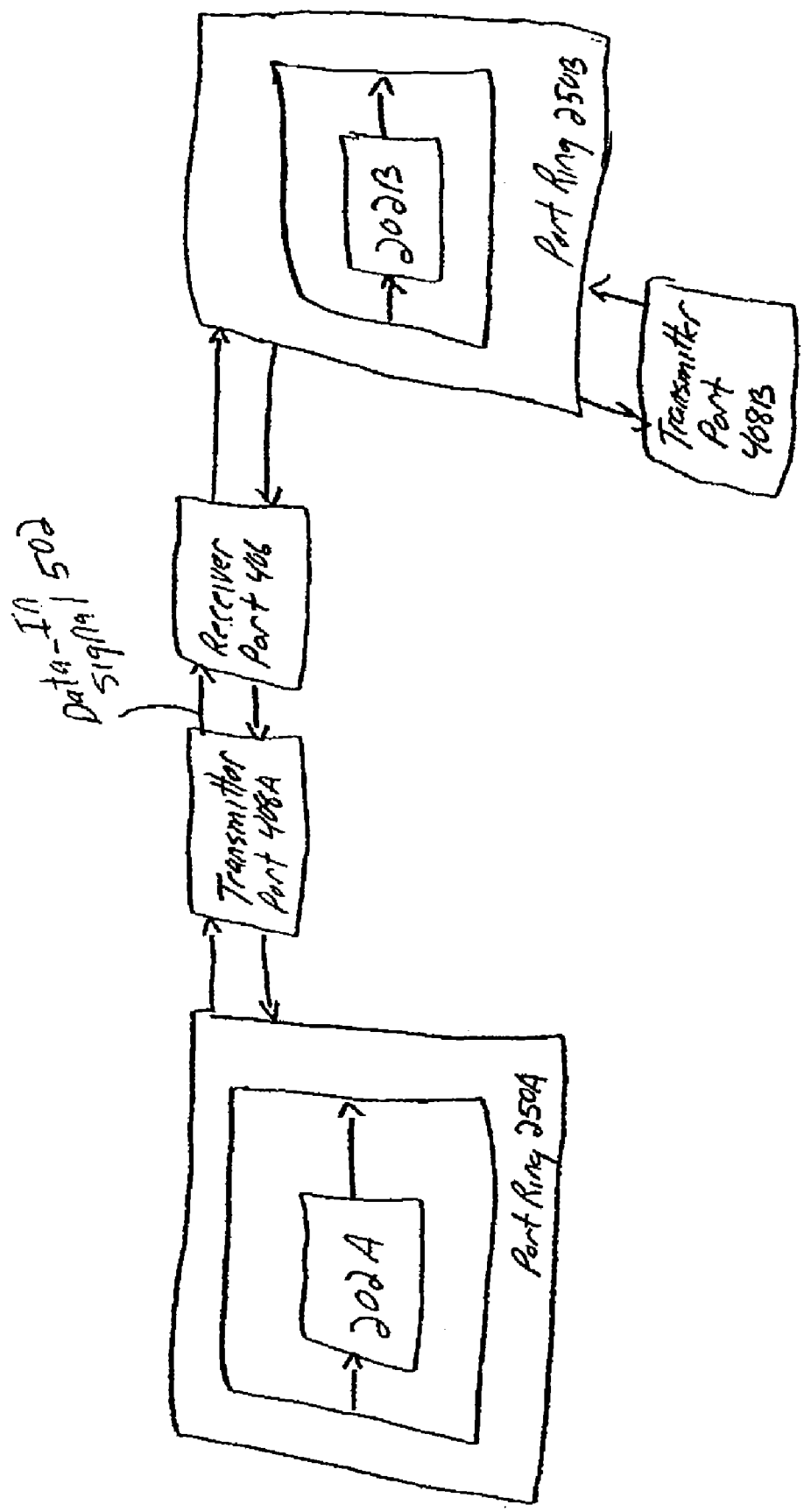
Figure 7E:
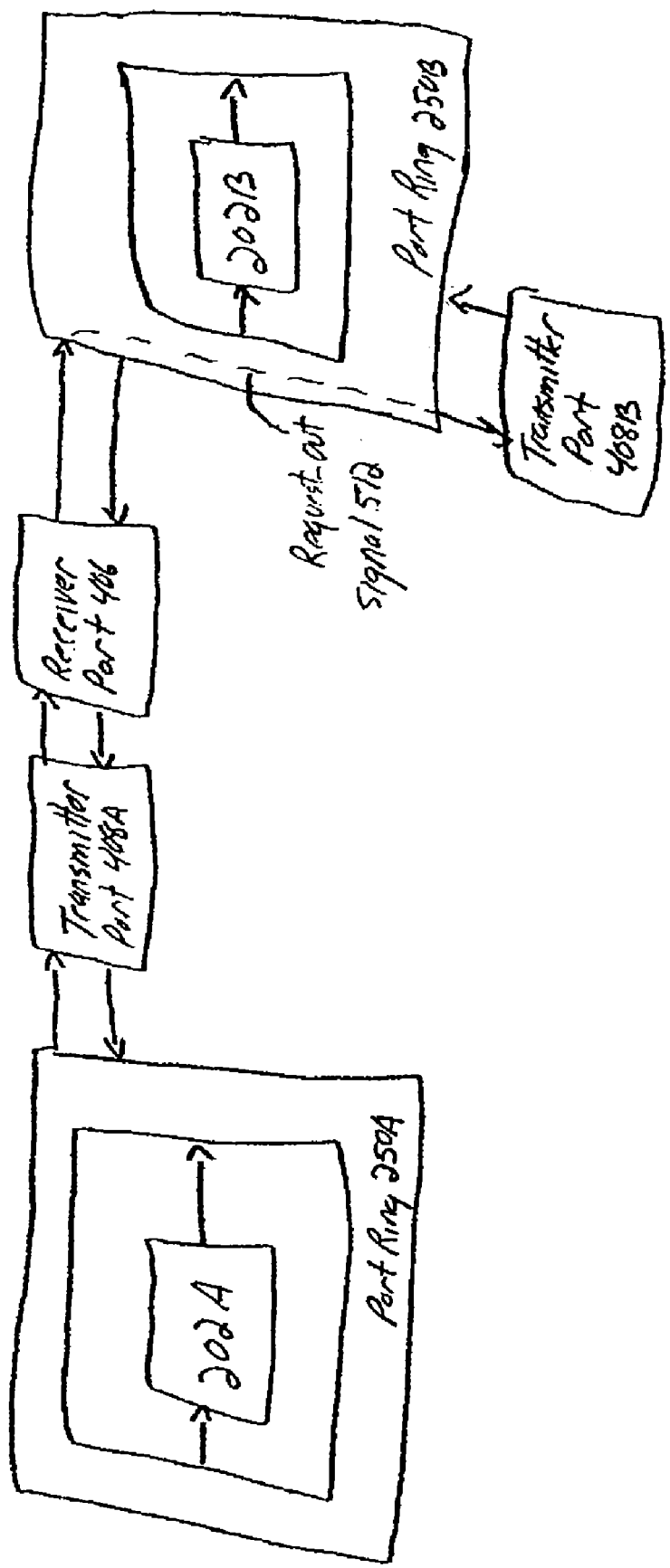
Figure 7F:
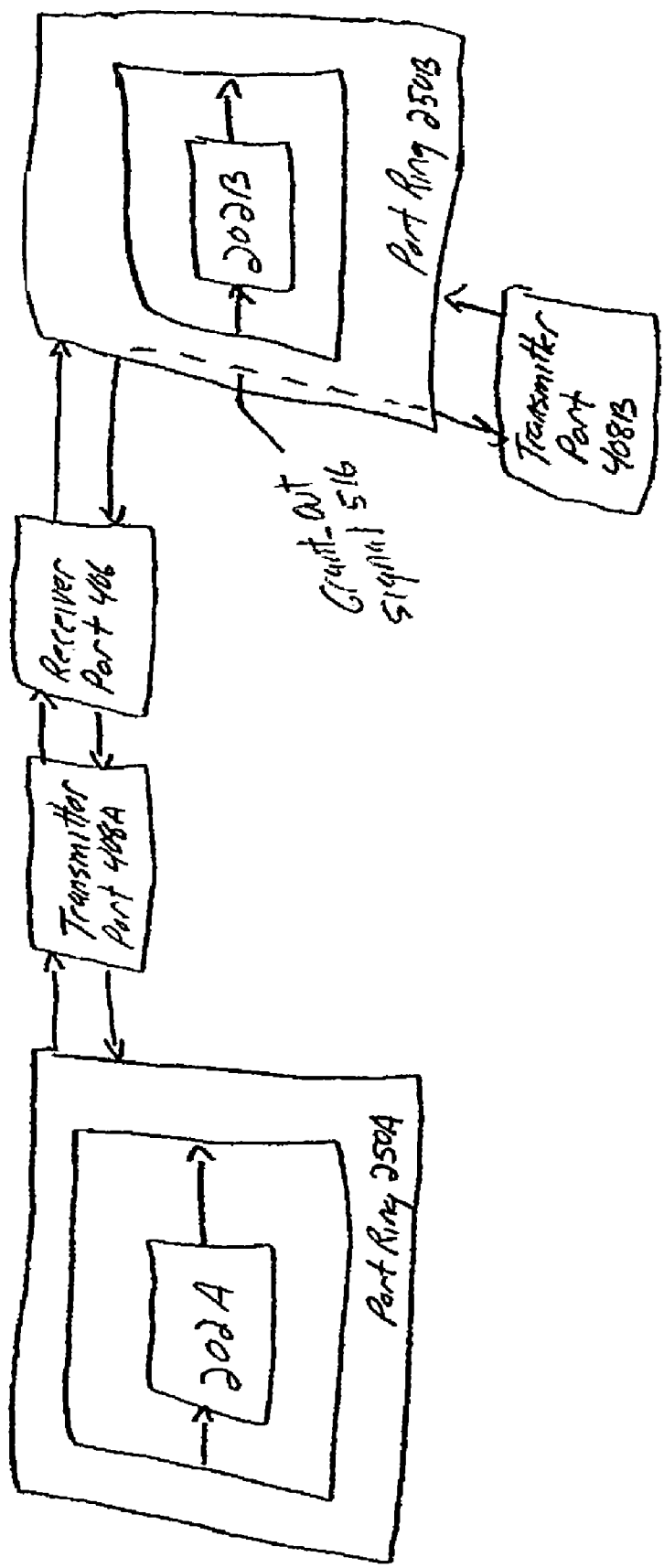
Figure 76:
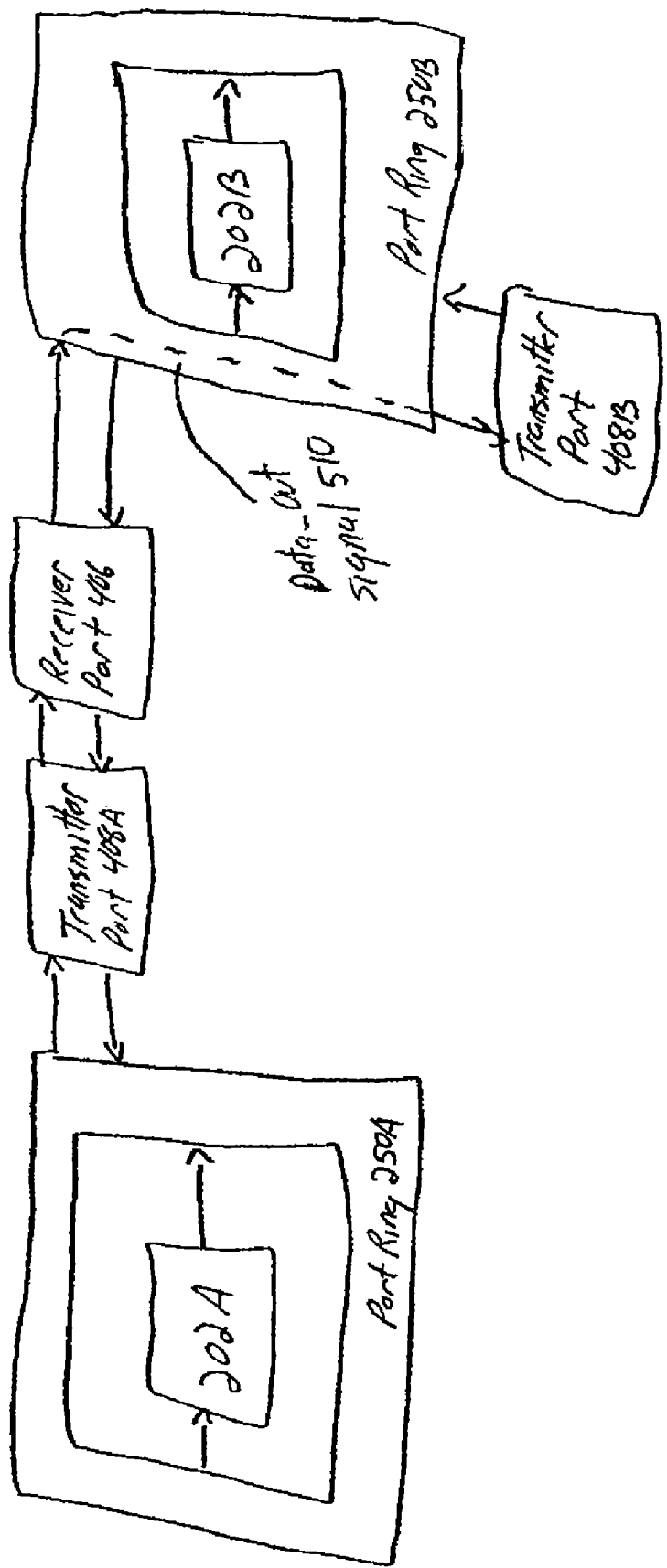

To illustrate, FIGS. 7A-7G illustrate a more detailed block diagram of a receiver port communicating with different transmitter ports, according to one embodiment of the invention. In particular, FIGS. 7A-7D illustrate a more detailed block diagram of the receiver port 406 communicating with the transmitter port 408A that is external to the port ring 250B. FIGS. 7E-7G illustrate a more detailed block diagram of the receiver port 406 communicating with the transmitter port 408B that is internal to the port ring 250B.

FIGS. 7A-7G illustrate the image signal processor 202A and the image signal processor 202B. The image signal processor 202A and the image signal processor 202B include the port ring 250A and the port ring 250B, respectively. Additionally, the image signal processors 202A-202B includes a number of receiver and transmitter ports. In particular, a given port 404 (shown in FIG. 4) includes a transmitter port and a receiver port. However, for the sake of clarity, FIGS. 7A-7G illustrate either a transmitter port or receiver port for a given port 404. The port ring 250A of the image signal processor 202A includes the transmitter port 408A. The port ring 250B of the image signal processor 202B includes the receiver port 406 and the transmitter port 408B.

FIG. 7A illustrates that the transmitter port 408A transmits the init_in signal 506 to the receiver port 406 to flush the FIFOs that are part of the logical connection (between itself and the receiver port 406). Furthermore, FIG. 7A illustrates that the receiver port 406 forwards this initialization through the logical connection, as the init_out signal 514 to the transmitter port 408B through the port ring 250B. Accordingly, part of the logical connection includes the transmitter port 408A, the receiver port 406 and the transmitter port 408B. This logical connection may include a number of other image signal processors 202. Therefore, this initialization may have been received by the transmitter port 408A from a different image signal processor 202 through one of the internal receiver ports 406 of the port ring 250A. Additionally, the transmitter port 408B may forward this initialization may to another image signal processor 202. Once the initialization of the logical connection is complete, data may be transmitted through this logical connection.

FIG. 7B illustrates that the transmitter port 408A uses the request_in signal 504 to request the inputting of data into the receiver port 406. FIG. 7C illustrates that, in response to the request_in signal 504, and after storage is available in the receiver FIFO 604 of the receiver port 406, the receiver port 406 uses the grant_in signal 508 to indicate to the transmitter port 408A that the transmitter port 408A may transmit data into the receiver port 406. FIG. 7D illustrates that the transmitter port 408A uses the data_in signal 502 to transmit data for storage into the receiver FIFO 604 of the receiver port 406 when the request_in signal 504 and the grant_in signal 516 are active on the active edge of the clock signal controlling the image processor 102.

Additionally as shown in FIG. 6, the receiver port 406 transmits and receives interface signals from a transmitter port 408B which are both part of a same port ring 250. FIGS. 7E-7G illustrate such communications.

FIG. 7E illustrates that the receiver port 406 uses the request_out signal 512 to request the inputting of data into the transmitter port 408B (one of the internal transmitter ports of the port ring 250B). FIG. 7F illustrates that, in response to the request_out signal 512, the transmitter port 408B transmits the grant_out signal 516 back to the receiver port 406. FIG. 7G illustrates that the receiver port 406 uses the data_out signal 510 to transmit the data to the transmitter port 408B when the request_out signal 512 and the grant_out signal 516 are active on the active edge of the clock signal controlling the image processor 102.

Furthermore, although not shown in FIGS. 7E-7G, the receiver port 406 may transmit/receive these interfaces signals (the request_out signal 512, the grant_out signal 516 and the data_out signal 510) to/from the input processor element 302 (illustrated within FIG. 3) for the image signal processor 202B. If the data within the receiver FIFO 604 is to be inputted to one of the processor elements (the input processor element 302, the output processor element 304 and/or the processor elements 306A-306C) within this image signal processor 202 for processing therein, the receiver port 406 transmits the request_out signal 512 to the input processor element 302. If the data within the receiver port 406 is to be transmitted to a device external to the image signal processor 202 (e.g., a different image signal processor 202, one of the DMA units 204 or one of the external interfaces 208), the receiver port 406 transmits the request_out signal 512 to the appropriate transmitter port 408 (the port that is part of the logical connection).

Figure 8:
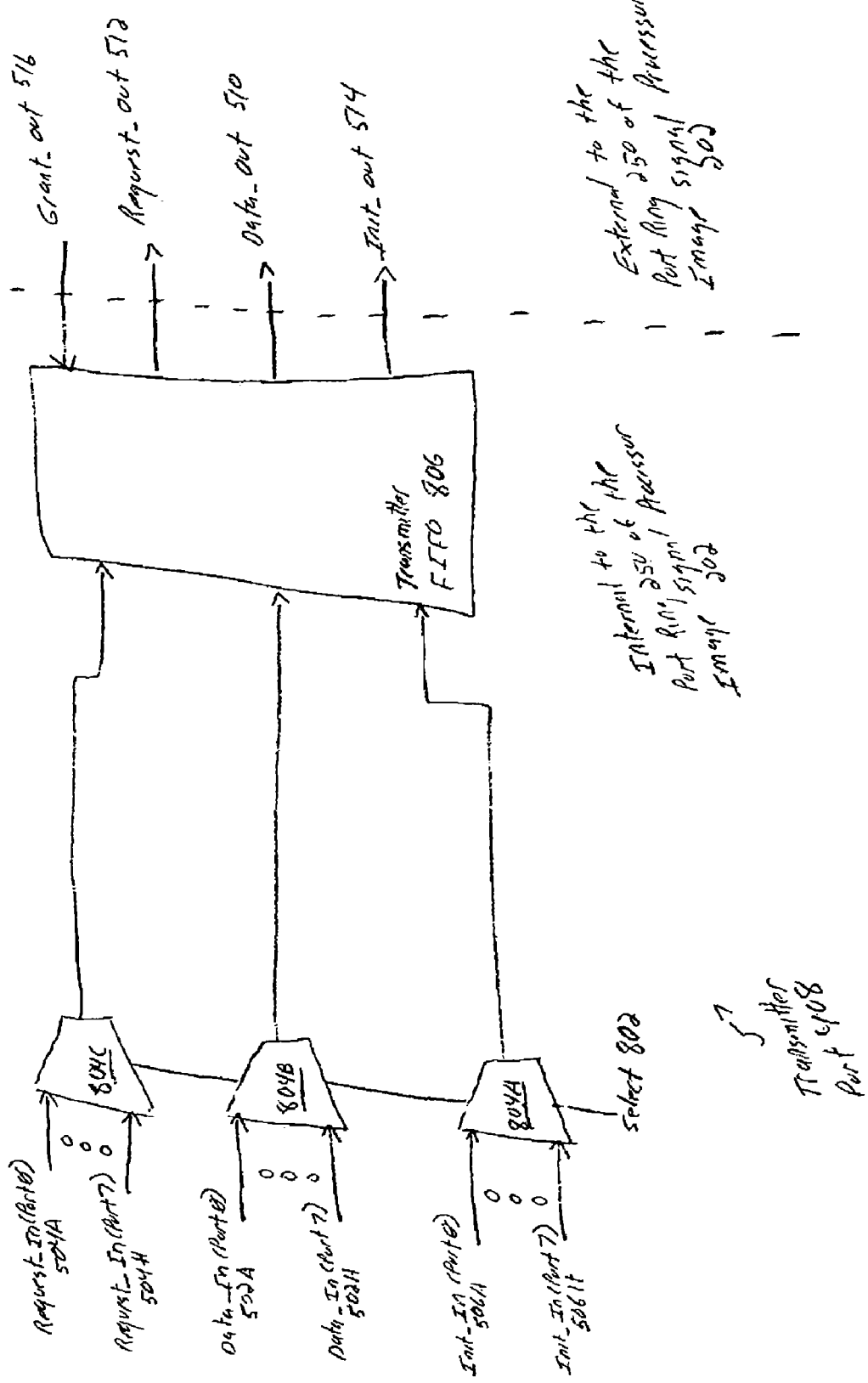
FIG. 8 illustrates a more detailed block diagram of a transmitter port along with associated interface signals, according to one embodiment of the invention.

FIG. 8 illustrates a more detailed block diagram of a transmitter port along with associated interface signals, according to one embodiment of the invention. In particular, FIG. 8 illustrates one embodiment of the transmitter port 408 (which includes a transmitter FIFO 806) and associated interface signals. The transmitter port 408 is within one of the ports 404 (shown in FIG. 4) and is to transmit data out from the image signal processor 202.

As shown, a number of the init_in signals 506A-506H, a number of the data_in signals 502A-502H and a number of the request_in signals 504A-504H are inputted into the transmitter port 408 from one of the receiver ports 406 that are internal to this image signal processor 202 (i.e., that are internal to the port ring 250 of the image signal processor 202). Additionally, the grant_out signal 516, the request_out signal 512, the data_out signal 510 and the init_out signal 514 are outputted from the transmitter port 408 to receiver ports 406 that are external to the port ring 250 for this image signal processor 202.

The transmitter FIFO 806 is coupled to receive interface signals (the number of the init_in signals 506A-506H, the number of the data_in signals 502A-502H and the number of the request_in signals 504A-504H) through a multiplexer 804A, a multiplexer 804B and a multiplexer 804C, respectively, from a number of receiver ports that are internal to the port ring 250 of the image signal processor 202 or the output processor element 304 (not shown in FIG. 8).

Figure 9A:
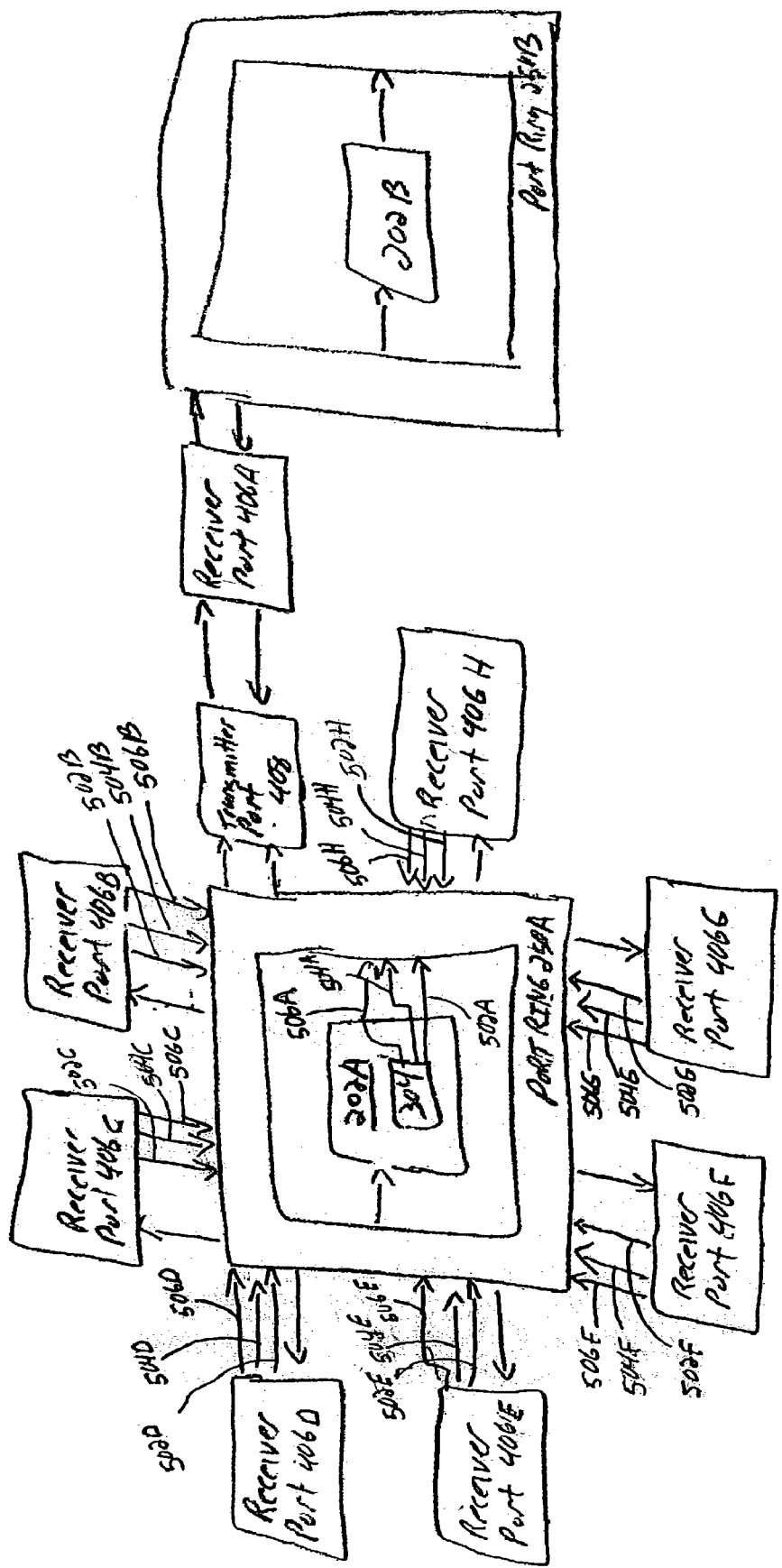
FIGS. 9A-9E illustrate a more detailed block diagram of a transmitter port communicating with different receiver ports that using different interface signals, according to one embodiment of the invention.

To illustrate, FIGS. 9A-9E illustrate a more detailed block diagram of a transmitter port communicating with different receiver ports that using different interface signals, according to one embodiment of the invention. In particular, FIG. 9A illustrates a more detailed block diagram of the transmitter port 408 receiving interface signals from elements that are internal to the port ring 250 of the image signal processor 202 that the transmitter port 408 is associated. FIGS. 9B-9E illustrate a more detailed block diagram of the transmitter port 408 receiving interface signals from a receiver port 406 that is external to the port ring 250 of the image signal processor 202 that the transmitter port 408 is associated.

FIGS. 9A-9E illustrate the image signal processor 202A and the image signal processor 202B. The image signal processor 202A and the image signal processor 202B include the port ring 250A and the port ring 250B, respectively. Additionally, the image signal processors 202A-202B includes a number of receiver and transmitter ports. In particular, a given port 404 (shown in FIG. 4) includes a transmitter port and a receiver port. However, for the sake of clarity, FIGS. 9A-9E illustrate either a transmitter port or receiver port for a given port 404. The port ring 250A of the image signal processor 202A includes the receiver ports 406B-406H and the transmitter port 408. The port ring 250B of the image signal processor 202B includes the receiver port 406A.

With regard to FIG. 9A, the output processor element 304 (within the image signal processor 202A) is coupled to transmit the init_in signal 506A, the data_in signal 502A and the request_in signal 504A. The receiver port 406B transmits the init_in signal 506B, the data_in signal 502B and the request_in signal 504B. The receiver port 406C transmits the init_in signal 506C, the data_in signal 502C and the request_in signal 504C. The receiver port 406D transmits the init_in signal 506D, the data_in signal 502D and the request_in signal 504D. The receiver port 406E transmits the init_in signal 506E, the data_in signal 502E and the request_in signal 504E. The receiver port 406F transmits the init_in signal 506F, the data_in signal 502F and the request_in signal 504F. The receiver port 406G transmits the init_in signal 506G, the data_in signal 502G and the request_in signal 504G. The receiver port 406H transmits the init_in signal 506H, the data_in signal 502H and the request_in signal 504H.

With regard to FIG. 8, the transmitter FIFO 806 within the transmitter port 408 uses a select signal 802 to cause the multiplexers 804A-804C to select one of the init_in signals 506, one of the data_in signals 502 and one of the request_in signals 504. As described above, the host processor 108 configures the image processor 102, wherein output from one processor element in an image signal processor 202 may be input to be processed by a different processor element in a different image signal processor 202 through a logical connection. Accordingly, the host processor 108 causes the transmitter FIFO 806 to assert the select signal 802 to select the init_in signal 506, the data_in signal 502 and the request_in signal 504 from the appropriate source. Returning to FIG. 2 to help illustrate, if a receiver port receives data into the image signal processor 202B and is to output the data through a transmitter port 408 in the image signal processor 202B to a receiver port in the image signal processor 202A, the host processor 108 would configure this transmitter port 408 to select signal 606 from this receiver port.

Accordingly, the selected receiver port 406 (or the selected output processor element 304) uses the init_in signal 506 to initialize the logical connection. In an embodiment, this initialization may include flushing of the receiver and transmitter FIFOs in the ports that are used in the logical connection. Therefore, if any data is within these FIFOs (prior to this initialization), this initialization causes the data to be deleted therefrom. Additionally, the selected receiver port 406 (or the selected output processor element 304) uses the request_in signal 504 to request the input of data into the transmitter FIFO 806 for the transmitter port 408. The selected receiver port 406 (or the selected output processor element 304) uses data_in signal 502 to transmit data into the transmitter FIFO 806.

Additionally as shown in FIG. 8, the transmitter port 408 transmits and receives interface signals from the receiver port 406A of a different image signal processor 202 (the image signal processor 202B). FIGS. 9B-9E illustrate such communications.

Figure 9B:
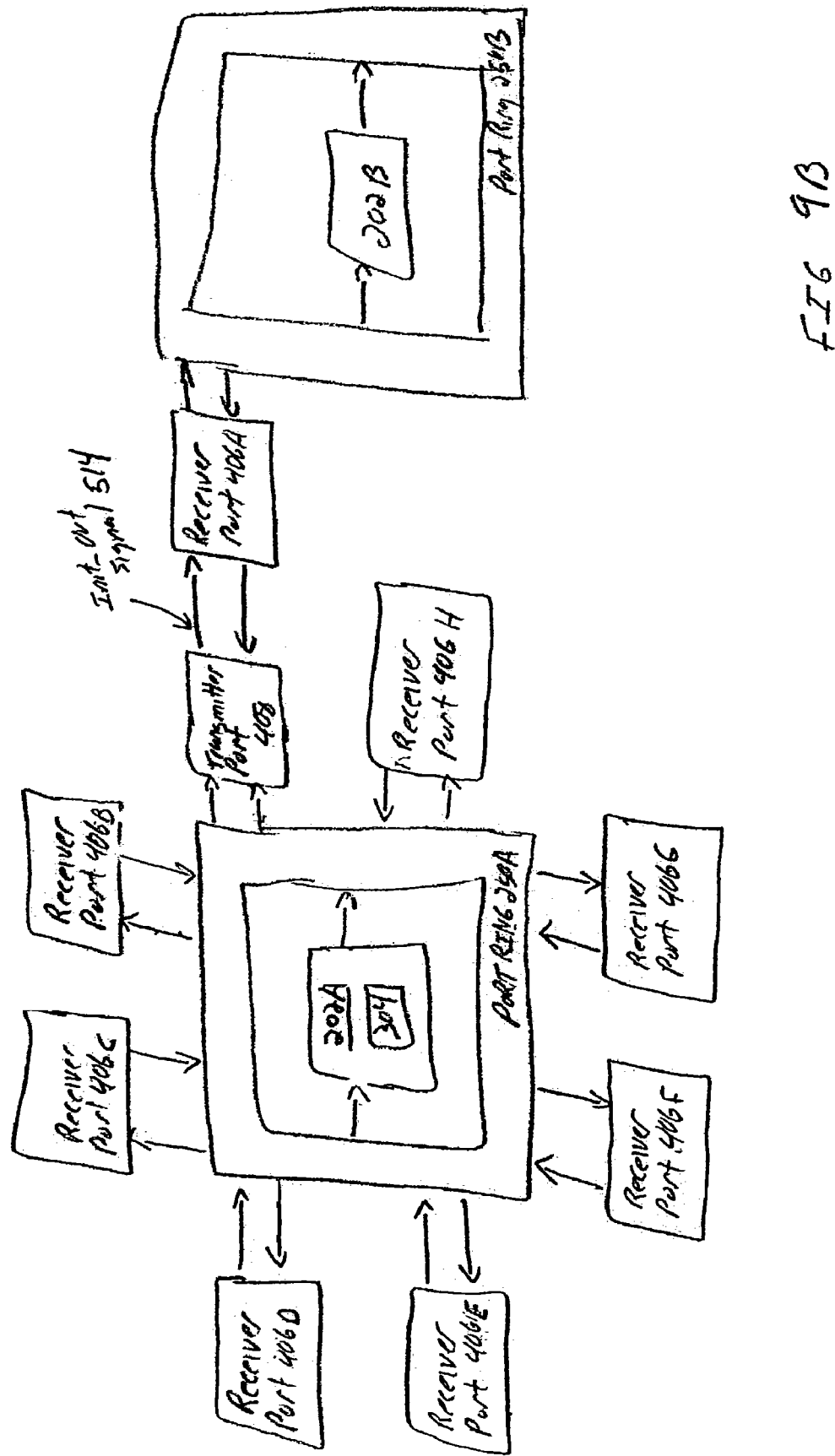
Figure 9C:
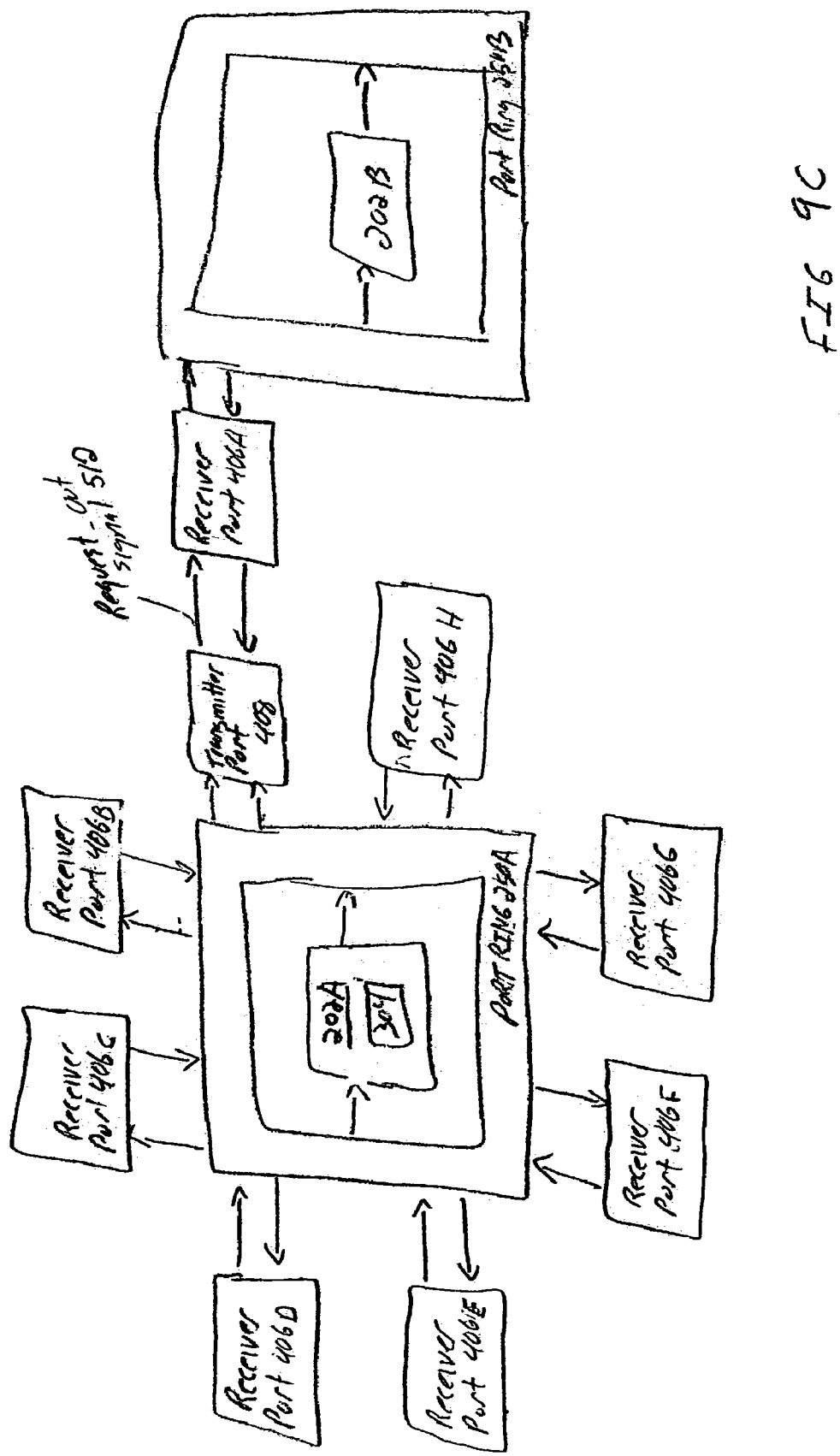
Figure 9D:
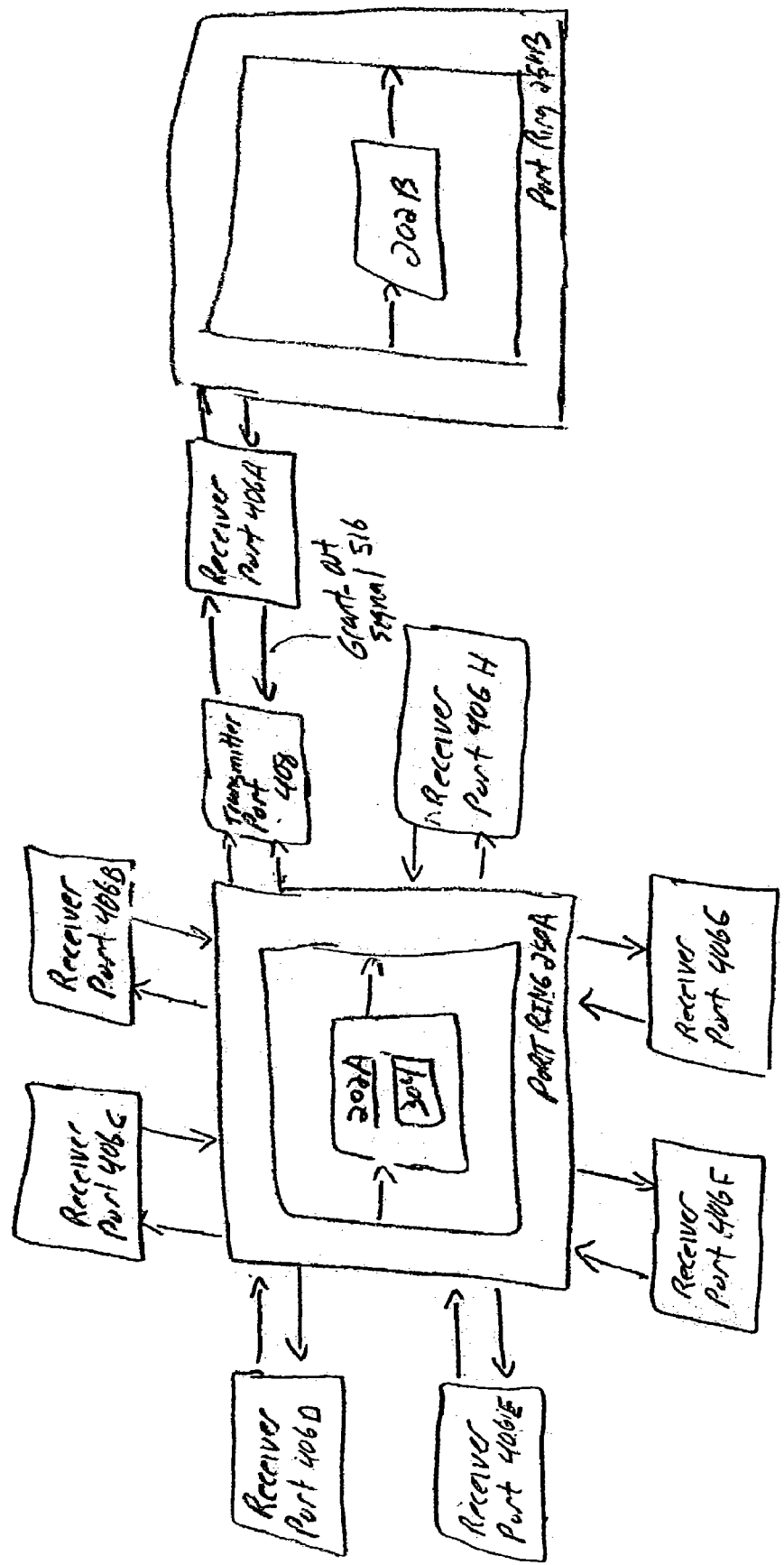
Figure 9E:
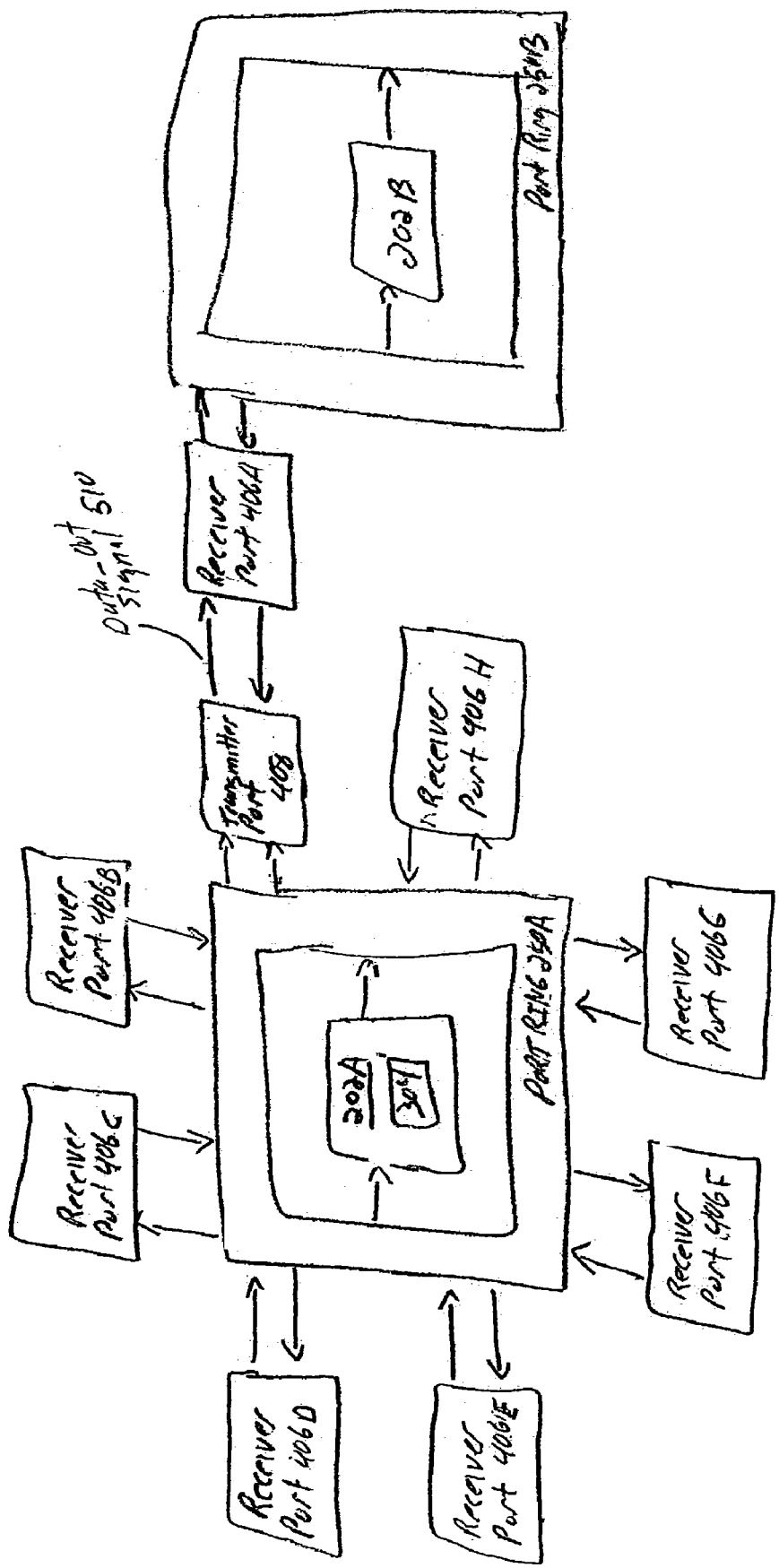

FIG. 9B illustrates that the transmitter port 408 outputs the init_out signal 514 to the receiver port 406A to which it is attached to generate the logical connection prior to the transmission of data (as described above). FIG. 9C illustrates that the transmitter port 408 outputs the request_out signal 512 to request the inputting of data into the receiver FIFO of the receiver port 406A. FIG. 9D illustrates that, in response, after space is available in the receiver FIFO of the receiver port 406A, the receiver port 406A outputs the grant_out signal 516 that is received by the transmitter port 408. FIG. 9E illustrates that, in response, the transmitter port 408 outputs data from the transmitter FIFO 806 to the receiver FIFO of the receiver port 406A using the data_out signal 510.

Logical Connections

FIG. 10 illustrates a number of different routes for a given logical connection from a source image signal processor to a destination image signal processor, according to one embodiment of the invention. As described above, the host processor 108 can establish a number of logical connections for the transmission of data from a source image signal processor 202 to a destination image signal processor 202. In particular, the output of one image processing operation by an element in a first image signal processor 202 may be used as input for a different image processing operation by an element in a second image signal processor 202.

For example, the first image signal processor 202 may convert the digitized scanned data into a sub-sampled color space, while the second image signal processor 202 receives the converted data and filters such data in order to separate data that is part of a pictorial image from data that is part of text. The second image signal processor 202 transmits the data that is part of the pictorial image to a third image signal processor 202 for further processing. The second image signal processor 202 transmits the data that is part of text to a fourth image signal processor 202 for further processing. In an embodiment, different image signal processors 202 perform different data operations because (as described in more detail below) one image signal processor 202 may have dedicated hardware accelerators for performing a given operation.

Moreover, while this example illustrates the output of an operation in one image signal processor 202 being transmitted directly to a different image signal processor 202, embodiments of the invention are not so limited. In an embodiment, one image signal processor 202 may transmit the output of an operation to one of the memories 104. Accordingly, a second image signal processor 202 may retrieve the stored data from the memory 104. Such operations may be used when the second image signal processor 202 may require a certain amount of the output from the first operation prior to its operations. For example, the first image signal processor 202 may convert the pixels of an image from left to right along a line, for each line in the image. The second image signal processor 202 may perform an operation that requires the first eight pixels from the first eight lines. Accordingly, the output from the first image signal processor 202 is stored in one of the memories 104 until at least the first eight pixels in the first eight lines have been processed. Continuing with this example, the first image signal processor 202 may continue to convert the data, while, simultaneously, the second image signal processor 202 may perform the filter operation of the data (as described above).

Because the architecture of the processors has a point-to-point configuration (as illustrated in FIG. 2), the first image signal processor 202 may not be directly connected to the second image signal processor 202. Therefore, a logical connection from the first image signal processor 202 (the source image signal processor 202) to the second image signal processor 202 (the destination image signal processor 202) through one to a number of intermediate image signal processors 202 is established.

FIG. 10 illustrates the image processor 102 of FIG. 2, along with five different routes for a given logical connection from the image signal processor 202A to the image signal processor 202H.

A first route 1002 for a logical connection starts at the image signal processor 202A (the source image signal processor) and goes through the port ring 250D of the image signal processor 202D (a first intermediate image signal processor) and completes at the port ring 250H of the image signal processor 202H (the destination image signal processor). In particular, the data is transmitted from a transmitter port of the port ring 250A of the image signal processor 202A to a receiver port of the port ring 250E of the image signal processor 202D. The receiver port of the port ring 250D of the image signal processor 202D transmits the data to a transmitter port of the port ring 250D of the image signal processor 202D (through the port ring 250D of the image signal processor 202D). This transmitter port of the port ring 250D of the image signal processor 202D transmits the data to a receiver port of the port ring 250H of the image signal processor 202H.

A second route 1004 for a logical connection starts at the image signal processor 202A (the source image signal processor) and goes through the image signal processor 202E (a first intermediate image signal processor) and completes at the image signal processor 202H (the destination image signal processor). In particular, the data is transmitted from a transmitter port of the port ring 250A of the image signal processor 202A to a receiver port of the port ring 250E of the image signal processor 202E. The receiver port of the port ring 250E of the image signal processor 202E transmits the data to a transmitter port of the port ring 250E of the image signal processor 202E (through the port ring 250E of the image signal processor 202E). This transmitter port of the port ring 250E of the image signal processor 202E transmits the data to a receiver port of the port ring 250H of the image signal processor 202H.

A third route 1006 for the logical connection starts at the image signal processor 202A (the source image signal processor) and goes through the image signal processor 202E (a first intermediate image signal processor) through the image signal processor 202F (a second intermediate image signal processor) through the image signal processor 202G (a third intermediate image signal processor) and completes at the image signal processor 202H (the destination image signal processor). In particular, the data is transmitted from a transmitter port of the port ring 250A of the image signal processor 202A to a receiver port of the port ring 250E of the image signal processor 202E. The receiver port of the port ring 250E of the image signal processor 202E transmits the data to a transmitter port of the port ring 250E of the image signal processor 202E (through the port ring 250E of the image signal processor 202E). This transmitter port of the port ring 250E of the image signal processor 202E transmits the data to a receiver port of the port ring 250F of the image signal processor 202F. The receiver port of the port ring 250F of the image signal processor 202F transmits the data to a transmitter port of the port ring 250F of the image signal processor 202F (through the port ring 250F of the image signal processor 202F). This transmitter port of the port ring 250F of the image signal processor 202F transmits the data to a receiver port of the port ring 250G of the image signal processor 202G. The receiver port of the port ring 2500 of the image signal processor 202G transmits the data to a transmitter port of the port ring 250G of the image signal processor 202G (through the port ring 250G of the image signal processor 202G). This transmitter port of the port ring 250G of the image signal processor 202G transmits the data to a receiver port of the port ring 250H of the image signal processor 202H.

A fourth route 1008 for the logical connection starts at the image signal processor 202A (the source image signal processor) and goes through the image signal processor 202B (a first intermediate image signal processor) through the image signal processor 202C (a second intermediate image signal processor) through the image signal processor 202D (a third intermediate image signal processor) and completes at the image signal processor 202H (the destination image signal processor). In particular, the data is transmitted from a transmitter port of the port ring 250A of the image signal processor 202A to a receiver port of the port ring 250B of the image signal processor 202B. The receiver port of the port ring 250B of the image signal processor 202B transmits the data to a transmitter port of the port ring 250B of the image signal processor 202B (through the port ring 250B of the image signal processor 202B). This transmitter port of the port ring 250B of the image signal processor 202B transmits the data to a receiver port of the port ring 250C of the image signal processor 202C. The receiver port of the port ring 250C of the image signal processor 202C transmits the data to a transmitter port of the port ring 250C of the image signal processor 202C (through the port ring 250C of the image signal processor 202C). This transmitter port of the port ring 250C of the image signal processor 202C transmits the data to a receiver port of the port ring 250D of the image signal processor 202D. The receiver port of the port ring 250D of the image signal processor 202D transmits the data to a transmitter port of the port ring 250D of the image signal processor 202D (through the port ring 250D of the image signal processor 202D). This transmitter port of the port ring 250D of the image signal processor 202D transmits the data to a receiver port of the port ring 250H of the image signal processor 202H.

A fifth route 1010 for the logical connection starts at the image signal processor 202A (the source image signal processor) and goes through the image signal processor 202B (a first intermediate image signal processor) through the image signal processor 202F (a second intermediate image signal processor) through the image signal processor 202G (a third intermediate image signal processor) and completes at the image signal processor 202H (the destination image signal processor). Accordingly, as shown, one to a number of different routes can be used to establish a logical connection between two different image signal processors 202. In particular, the data is transmitted from a transmitter port of the port ring 250A of the image signal processor 202A to a receiver port of the port ring 250B of the image signal processor 202B. The receiver port of the port ring 250B of the image signal processor 202B transmits the data to a transmitter port of the port ring 250B of the image signal processor 202B (through the port ring 250B of the image signal processor 202B). This transmitter port of the port ring 250B of the image signal processor 202B transmits the data to a receiver port of the port ring 250F of the image signal processor 202F. The receiver port of the port ring 250F of the image signal processor 202F transmits the data to a transmitter port of the port ring 250F of the image signal processor 202F (through the port ring 250F of the image signal processor 202F). This transmitter port of the port ring 250F of the image signal processor 202F transmits the data to a receiver port of the port ring 250G of the image signal processor 202G. The receiver port of the port ring 250G of the image signal processor 202G transmits the data to a transmitter port of the port ring 250G of the image signal processor 202G (through the port ring 250G of the image signal processor 202G). This transmitter port of the port ring 250G of the image signal processor 202G transmits the data to a receiver port of the port ring 250H of the image signal processor 202H.

As described, the traversal through an intermediate image signal processor 202 is through the ports 404 of the port ring 250 and not through processor elements or other components internal to the image signal processor 202. Therefore, the processor elements within an intermediate image signal processor 202 do not perform any type of operation on data that is transmitted from the source image signal processor 202 and the destination image signal processor 202.

Therefore, this architecture uses a combination of hard-wired point-to-point connections which are configurable. A transmitter port is connected to a predefined destination, which allows for simply and direct wiring of the die of the image processor 102. However, a given transmitter port can select one of several sources for the transmitted data. In turn, a receiver port makes its data available to a number of transmitter ports. This architecture allows for efficient routing of data and control within the port ring 250 for an image signal processor 202. Moreover, passing the initialize signal through a logical connection allows for single-point clearing of the logical path that the data is to traverse at the source of the data and ensure that the intermediate connections do not need to be cleaned up or emptied before or after data transfers. Moreover, logical connections that transfer an indeterminate amount of data and get backed up or stalled can be cleared out with a single command beginning at the source and traversing the logical connection.

Operations of an Image Processor

Figure 11:
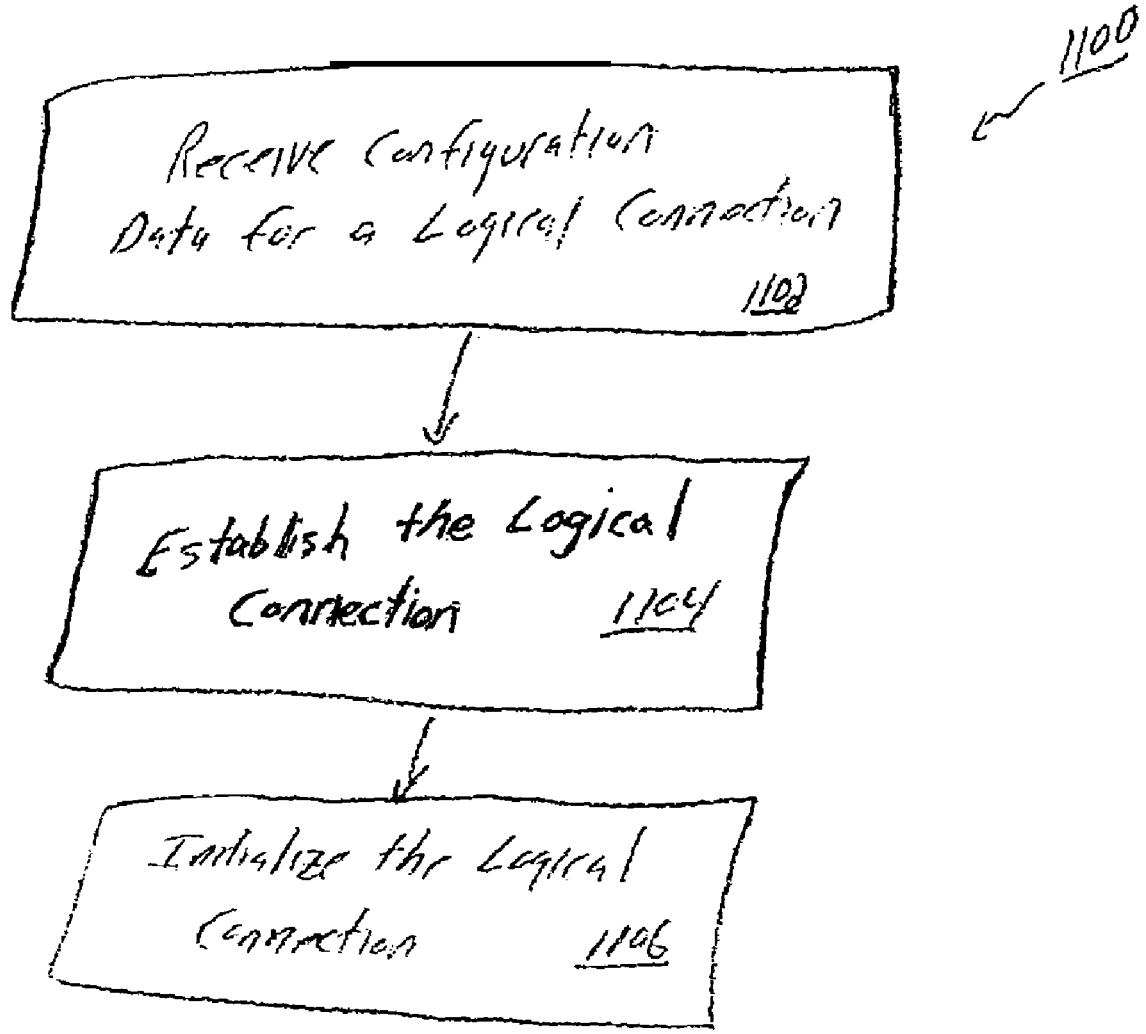
FIG. 11 illustrates a flow diagram for establishing and initializing of a logical connection within an image processor, according to one embodiment of the invention.

FIG. 11 illustrates a flow diagram for establishing and initializing of a logical connection within an image processor, according to one embodiment of the invention.

In block 1102, configuration data for a logical connection to be established for transmission of data is received. With reference to FIG. 2, the different image signal processors 202 (the source image signal processor, the intermediate image signal processor(s) and the destination image signal processor) receives the configuration data for a logical connection to be established for transmission of data. In an embodiment, the host processor 108 transmits this configuration data to these image signal processors 202 through the internal global bus 212. In an embodiment, the host processor 108 may also download microcode into the image signal processors 202 that are part of the logical connection. For example, the host processor 108 may download a specific application into the source and/or destination image signal processor 202. Control continues at block 1104.

In block 1104, the logical connection is established. With reference to FIGS. 6 and 8, the receiver ports 406 and the transmitter ports 408 (through which data is transmitted as part of the logical connection) establish the logical connection based on the configuration data received. As described above, the receiver ports 406 use the select signals 606 to determine which grant_out signal 516 will be selected by multiplexer 602. For example, if the data received into the receiver port 406A is to be outputted to the transmitter port 408D, then the configuration data causes the receiver port 406A is use the select signal 606 to select the grant_out signal 516 associated with the transmitter port 408D. Similarly, the transmitter ports 408 uses the select signals 802 to determine which of the request_in signal 504, the data_in signal 502 and the init_in signal 506 will be selected by the multiplexer 804C, the multiplexer 804B and the multiplexer 804A, respectively. Control continues at block 1106.

In block 1106, the logical connection is initialized. With reference to FIGS. 2, 6 and 8, the transmitter port 408 for the source image signal processor 202 that is to originate this logical connection transmits the init_out signal 514 to the receiver port 406 of the next source image signal processor 202 involved with this logical connection. This receiver port 406 receives this signal as init_in signal 506 and outputs the init_out signal 514 to the transmitter port within this source image signal processor 202. This transmission of init_out signals 514 and receipt of init_in signals 506 continues along the logical connection until the transmitter port 408 of the destination image signal processor 202 is reached. Accordingly, this initialize signal initializes the different ports involved in the logical connection. In an embodiment, this initialization may include flushing of the receiver and transmitter FIFOs that are used in the logical connection. Therefore, if any data is within these FIFOs from a previous logical connection, this initialization causes the data to be deleted therefrom.

Figure 12:
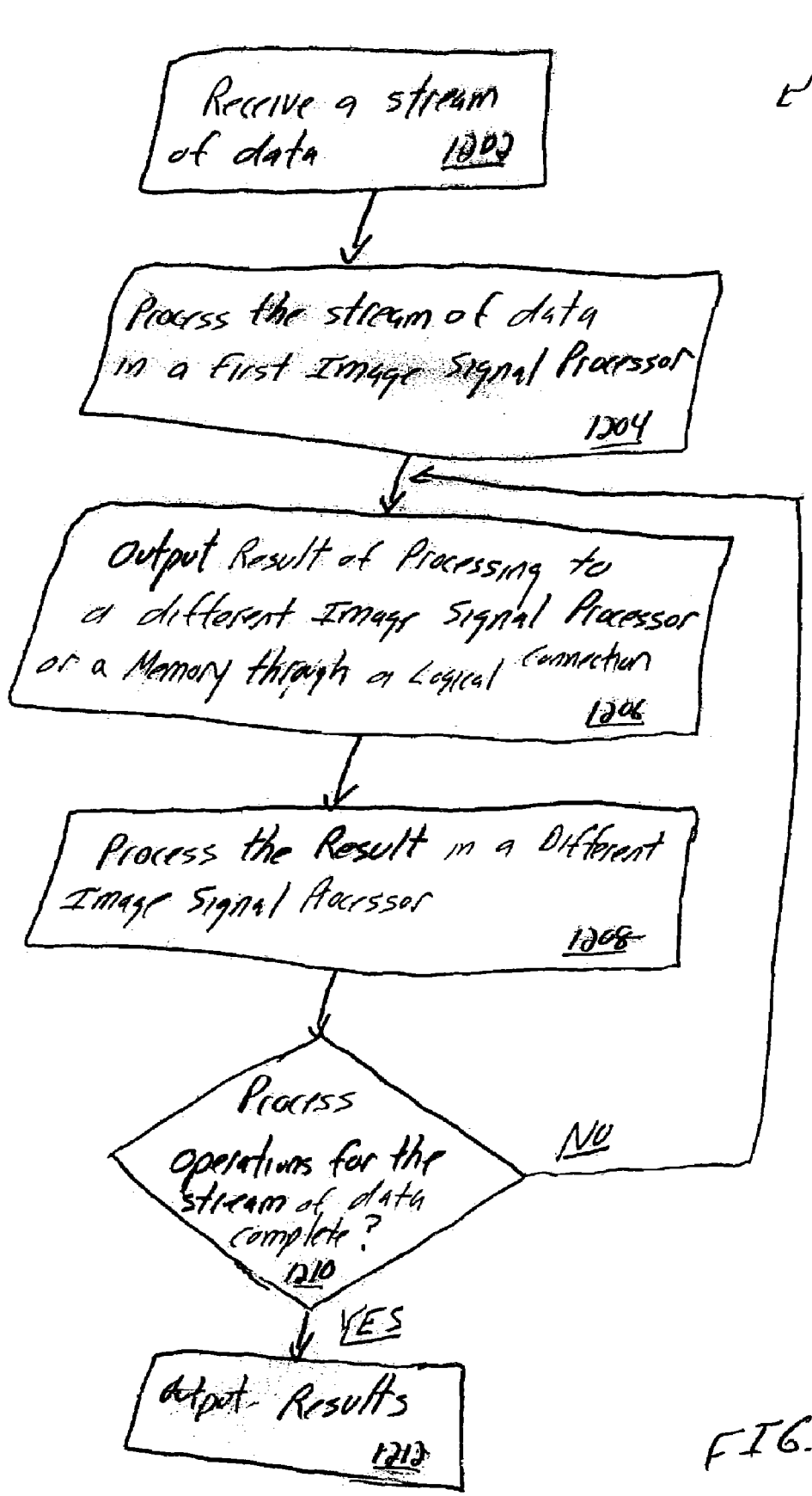
FIG. 12 illustrates a flow diagram for processing of data by an image processor, according to one embodiment of the invention.

In an embodiment, a series of image process operations are performed/executed by different components in different image signal processors 202 within the image processor 102. The output of a first image process operation is used as input to a second image process operation, etc. As described above, logical connections are established for the transmission of the data to the different image signal processors 202. Therefore, a logical connection is established for each transmission from one element in the image processor 102 to a different element in the image processor 102. One embodiment for the processing of data in the image processor 102 will now be described. FIG. 12 illustrates a flow diagram for processing of data by an image processor, according to one embodiment of the invention. In particular, the flow diagram 1200 describes the processing of data by one of the image signal processors 202 within the image processor 102, according to one embodiment of the invention.

In block 1202, a stream of data is received. With reference to FIG. 2, a first of the image signal processors 202 receives the stream of data from one of a number of sources. For example, the image signal processor 202A may receive the stream of data from an external source (such as the sensor 116). The image signal processor 202A may also receive the stream of data from the memory 104A through the memory interface 206A and the DMA unit 204A. Control continues at block 1204.

In block 1204, the stream of data is processed in a first image signal processor. With reference to FIG. 2, a component (e.g., one of the processor elements 302, 304, 306A-306C or one of the accelerator units 310A-310B) within the first image signal processor 202 performs a first image process operation. The input processor element 302 receives the data through the receiver port 406. In an embodiment, any of the processor elements 302, 304, 306A-306C performs/executes the image process operation on the received data. In one embodiment, as part of the configuration of the logical connection of which the image process operation is associated, the host processor 108 may indicate which of the components in the first image signal processor 202 is to perform/execute the image process operation. Accordingly, the input processor element 302 may store the data into the memory 314 wherein the designated components retrieves the data and performs/executes the first image process operation on such data. The first image signal processor 202 may output a result for processing a part of the stream of data, while continuing to process a different part of the stream of data. For example, for a scanned image, the first image signal processor 202 may output a result for processing the first eight lines of the scanned image, while continuing to process subsequent lines of the scanned image. Control continues at block 1206.

In block 1206, the output of the image process operation is transmitted/forwarded to a different image signal processor or a memory through a logical connection. With reference to FIGS. 2 and 3, the output processor element 304 (in the image signal processor 202 in which the first image process operation is performed/executed) transmits/forwards the output of the image process operation through a transmitter port 408 that is part of the configured logical connection to a different image signal processor 202 or to one of the memories 104A-104B through the configured logical connection. Control continues at block 1208.

In block 1208, the result is processed in the different image signal processor. Similar to the processing in the first image signal processor (described in block 1204), a component (e.g., one of the processor elements 302, 304, 306A-306C or one of the accelerator units 310A-310B) within the different image signal processor 202 performs a different image process operation. For example, the first image process operation is to convert digitized scanned data into a sub-sampled color space, while the second image process operation is to filter the result of the first image process operation in order to separate data that is part of a pictorial image from data that is part of text. Control continues at block 1210.

In block 1210, a determination is made of whether the process operations for the stream of data are completed. In particular, the current image signal processor 202 that is processing a part of the stream of data determines whether the output of its operations is to be transmitted to a different image signal processor 202 or to one of the memories 104A-104B through a logical connection based on configuration data received from the host processor 108. In particular, the host processor 108 may configure the image processor 102 to receive a stream of data and to perform five different image process operations in five different image signal processors 202. Accordingly, the host processor 108 configures the different logical connections to transmit the data to the five different image signal processors 202 in a given order. Upon determining that the image process operations are not complete for the stream of data, control continues at block 1006 wherein the result of the processing is outputted to a different image signal processor 202 or one of the memories 104A-104B. The operations of block 1206 and 1206 continue until the image process operations are complete for the stream of data.

In block 1212, upon determining that the image process operations are complete for the stream of data, the results are outputted. With reference to FIG. 2, in one embodiment, the final image signal processor 202 in the chain of image signal processors to process the stream of data outputs the result to one of the memories 104A-104B. With reference to FIG. 1, in an embodiment, the final image signal processor 202 outputs the result to an application executing within the host processor 108 or to a secondary storage device (not shown), a monitor (not shown) and/or a printer coupled to the I/O interfaces 110.

Figure 13A:
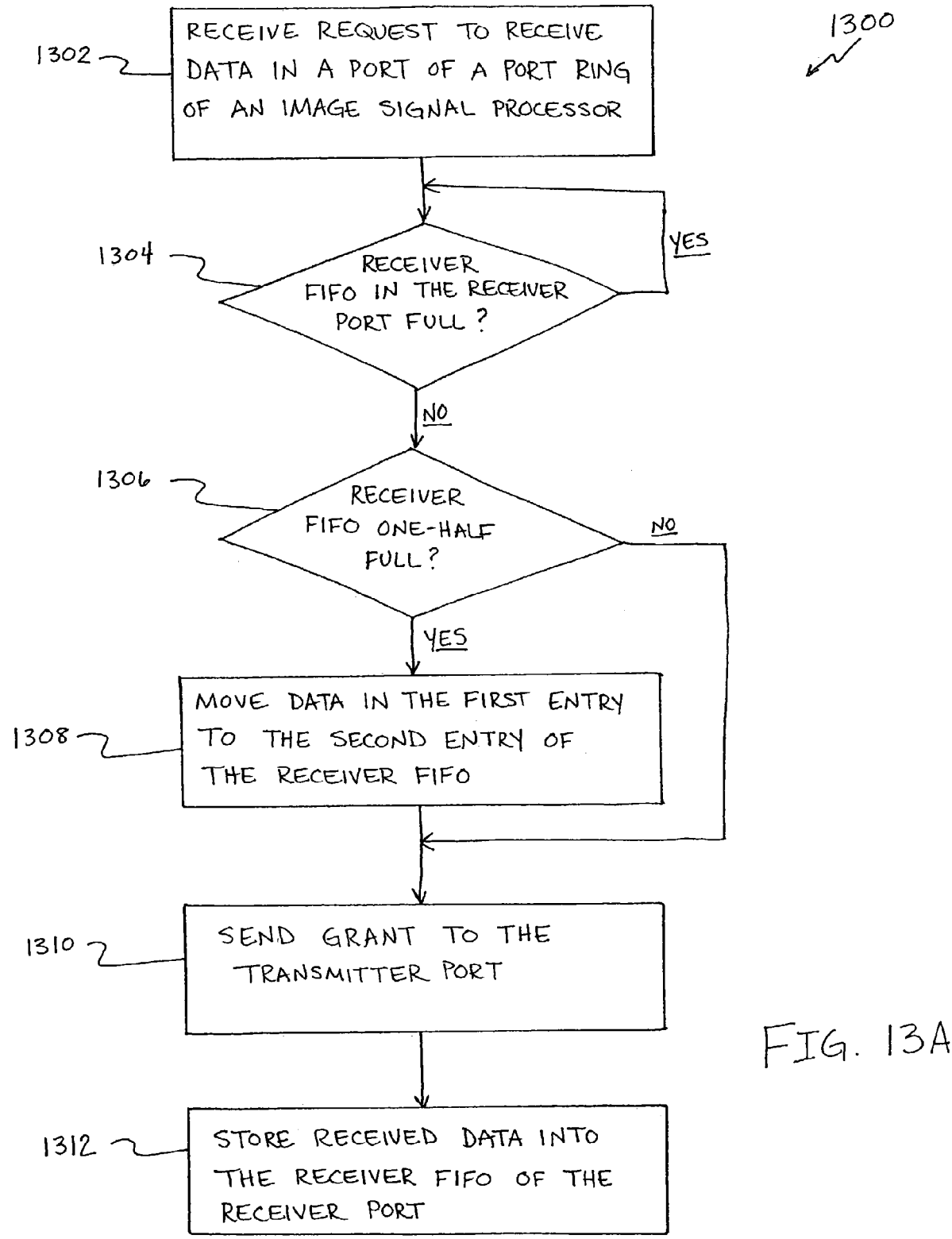
FIGS. 13A-13B illustrate flow diagrams for communications among memories of different ports in an image processor, according to embodiments of the invention.
Figure 13B:
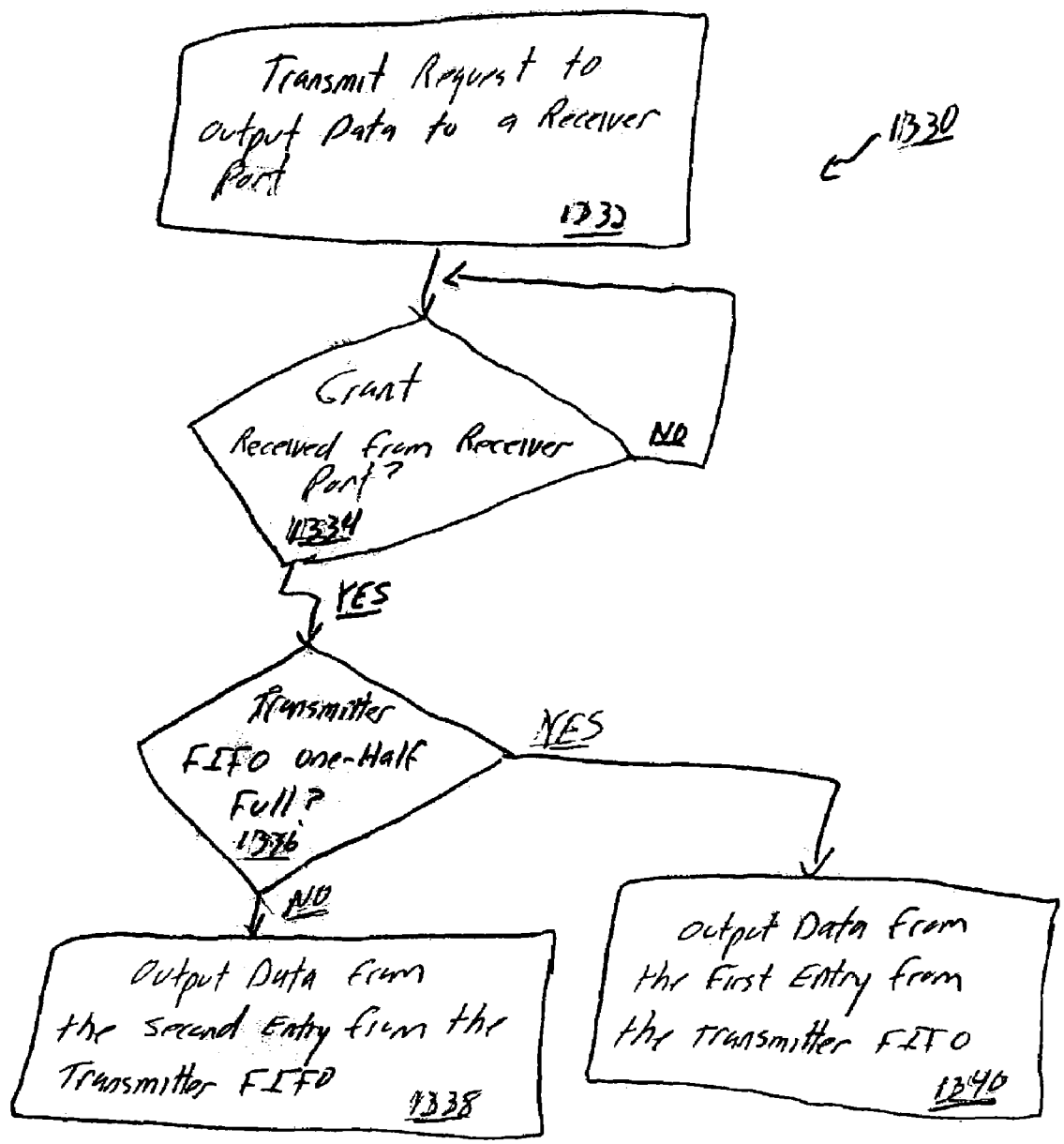

One embodiment of the operations for the transmission of data between different ports of the image signal processors 202 based on a handshake protocol will now be described. In particular, FIGS. 13A-13B illustrate flow diagrams for communications among memories of different ports in an image processor, according to embodiments of the invention. By way of example and not by way of limitation, the operations of the flow diagram 1300 and 1330 are described such that the FIFO memories within these different ports have a depth of two (i.e., a two-entry FIFO). FIG. 13A illustrates a flow diagram for receiving data into a memory of a port, while FIG. 13B illustrates a flow diagram for transmitting data out of a memory of a port.

In block 1302, a request to receive data is received into a receiver port of a port ring of an image signal processor. With reference to FIG. 6, the receiver port 406 receives a request to receive data through the request_in signal 504. As described above, a transmitter port 408 that is coupled to the receiver port 406 transmits this request. Control continues at block 1304.

In block 1304, a determination is made of whether the receiver FIFO of the receiver port is full. With reference to FIG. 6, the receiver port 406 determines whether the receiver FIFO 406 is full. Upon determining that the receiver FIFO 604 of the receiver port 406 is full, control continues at block 1304 where this determination is again made. In an embodiment, this request may time out after a predetermined period, wherein an alarm is issued to the host processor 108 and the operation of the flow diagram 1300 are aborted.

In block 1306, upon determining that the receiver FIFO 604 of the receiver port 406 is not full, a determination is made of whether the receiver FIFO is one-half full. As described above, the receiver FIFO 604 is described as having a depth of two. With reference to FIG. 6, the receiver port 406 determines whether the receiver FIFO 604 is one-half full. In other words, the receiver port 406 determines whether the receiver FIFO 604 is empty or has data in one entry. Upon determining that the receiver FIFO is not one-half full (i.e., the receiver FIFO is empty), control continues at block 1310, which is described in more detail below.

In block 1308, upon determining that the receiver FIFO is one-half full, data stored in the first entry in the receiver FIFO is moved to the second entry in the receiver FIFO. With reference to FIG. 6, the receiver port 406 moves the data stored in the first entry to the second entry in the receiver FIFO 604. Control continues at block 1310.

In block 1310, a grant is sent to the requesting transmitter port (the transmitter port requesting to send data to the receiver port). With reference to FIG. 6, the receiver port 406 transmits a grant through the grant_in signal 508 to the transmitter port 408, thereby indicating that the transmitter port 408 may transmit data into the receiver FIFO 604. Control continues at block 1312.

In block 1312, received data is stored into the receiver FIFO of the receiver port. With reference to FIG. 6, the receiver port 406 stores the received data into the first entry of the receiver FIFO 604, which is received from the transmitter port 408 through the data_in signal 502.

An embodiment of transmitting data out of a memory of a port is now described in conjunction with the flow diagram 1330 of FIG. 13B. In block 1332, a request to output data to a receiver port is transmitted. With reference to FIG. 8, the transmitter port 408 transmits the request to output data to the receiver port 406 (to which the transmitter port 408 is coupled) through the request_out signal 512. Control continues at block 1334.

In block 1334, a determination is made of whether a grant has been received from the receiver port. With reference to FIG. 8, the transmitter port 408 determines whether a grant has been received from the receiver port 406 based on the value of the grant_out signal 516. Upon determining that the grant has not been received from the receiver port 406, control continues at block 1334, wherein the transmitter port 408 again makes this determination. In an embodiment, this checking of a grant may time out after a predetermined period, wherein an alarm is issued to the host processor 108 and the operation of the flow diagram 1300 are aborted.

In block 1336, upon determining that the grant has been received from the receiver port, a determination is made of whether the transmitter FIFO is one-half full. With reference to FIG. 8, the transmitter port 408 determines whether the transmitter FIFO 706 is one-half full. Because the operations of the flow diagram 1330 have been initiated, the assumption is that the transmitter FIFO 706 is not empty.

In block 1338, upon determining that the transmitter FIFO is not one-half full (the transmitter FIFO is full), data from the second entry of the transmitter FIFO is outputted to the receiver FIFO. With reference to FIG. 8, the transmitter port 408 outputs the data from the second entry of the transmitter FIFO 706 through the data_out signal 510 to the receiver FIFO, thereby completing the operations of the flow diagram 1330.

In block 1340, upon determining that the transmitter FIFO is one-half full, data from the first entry of the transmitter FIFO is outputted to the receiver FIFO. With reference to FIG. 8, the transmitter port 408 outputs the data from the first entry of the transmitter FIFO 706 through the data_out signal 510 to the receiver FIFO, thereby completing the operations of the flow diagram 1330.

While the flow diagrams 1300 and 1330 describe the communications between receiver and transmitter ports that are part of different port rings, the handshake protocol operations described are also applicable to communications between receiver and transmitter ports that are part of the same port ring. Moreover, such handshake protocol operations are applicable for the inputting and outputting of data into the input processor element 302 and the output processor element 304, respectively.

Accordingly, as described in FIG. 13A-13B, in an embodiment, the data driven architecture for image process operations is based on this handshake protocol for transmitting data through the different port for logical connections. A bubble is a clock period where no data transaction occurred (i.e., data was not moved in the given clock period). For example, data was not ready to be transmitted at the beginning and/or data was not retrieved at the end of the logical connection. Therefore, there may be an empty place in the logical connection because data was not put into the logical connection.

Moreover, as described, if a bubble forms in the logical connection because of a data stall condition at the source image signal processor or the destination image signal processor, then data is paused for a single clock period. In other words, the FIFO memories within the receiver and transmitter ports allow for bubbles in the logical connection that do not grow from stopping and restarting of the data flow within the logical connection. Embodiments of the invention are such that a bubble does not force a delay at either end of the logical connection beyond the bubble. The bubble does not require the image processor 102 to resync (which may require more clock periods to recover than the number of clocks periods associated with the bubble itself)

Multi-Image Processor System

Figure 14:
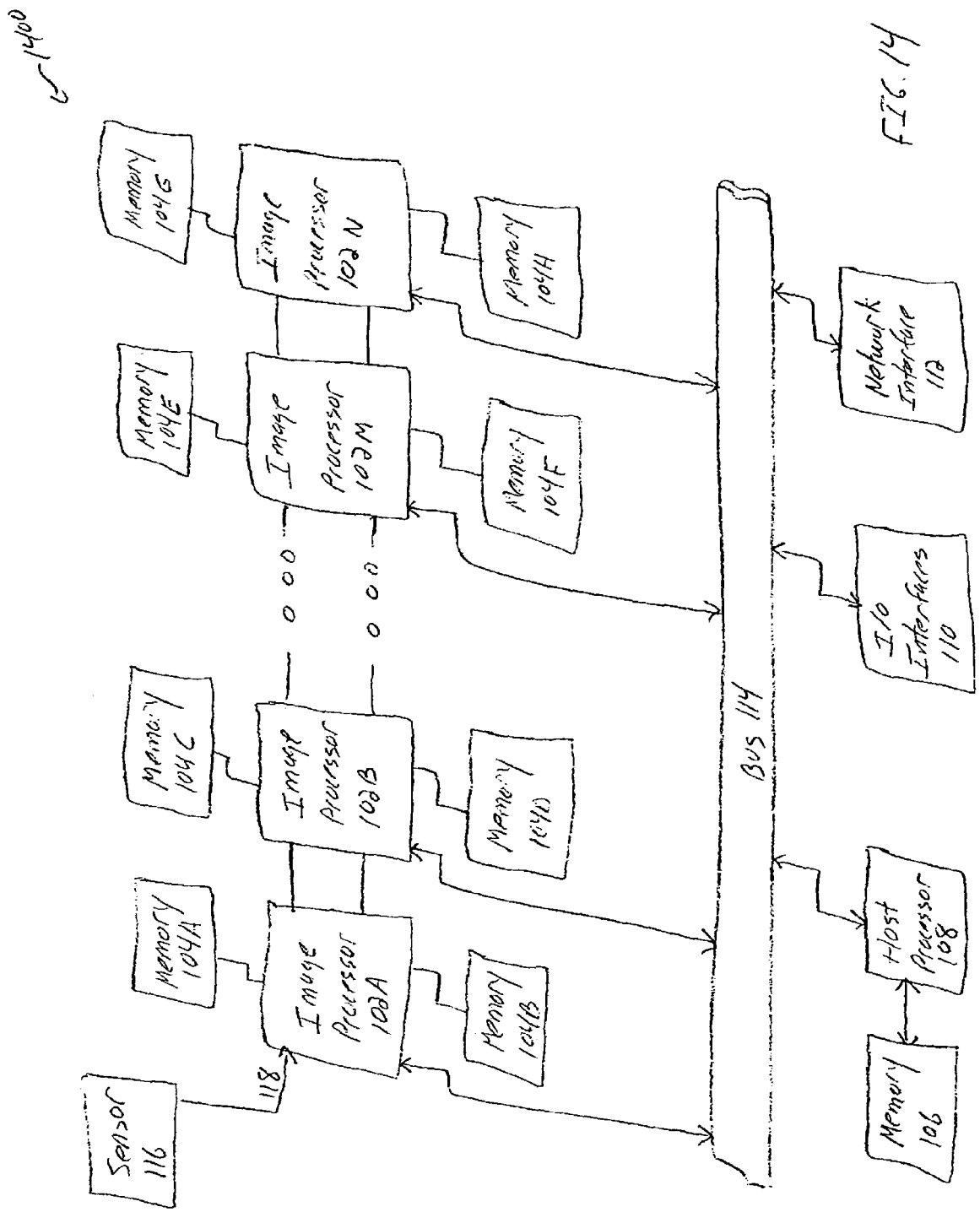
FIG. 14 illustrates a system for a multi-image processor to processor communication in a data driven architecture, according to another embodiment of the invention.

FIG. 14 illustrates a system for a multi-image processor to processor communication in a data driven architecture, according to another embodiment of the invention. In particular, FIG. 14 illustrates a system 1400 that includes the sensor 116, the memory 106, the host processor 108, the I/O interfaces 110 and the network interface 112 (as described above in conjunction with FIG. 1). In contrast to the system 100 of FIG. 1, the system 1400 includes a number of image processors 102A-102N that are coupled together. The image processor 102A is coupled to the image processor 102B. The image processor 102B is coupled to the image processor 102M (possible through one to a number of other image processors 102). The image processor 102M is coupled to the image processor 102N. In an embodiment, the number of image processors 102A-102N are coupled together through the expansion interfaces 208A-208D.

Similar to the system 100 of FIG. 1, an image processor 102 is coupled to a number of memories 104. The image processor 102A is coupled to the memories 104A-104B. The image processor 102B is coupled to the memories 104C-104D. The image processor 102M is coupled to the memories 104E-104F. The image processor 102 is coupled to the memories 104G-104H. In an alternative embodiment, the image processors 102A-102N may share one set of memories 104. For example, the image processors 102A-102N may each be coupled to the memories 104A-104B, wherein the image processors 102A-102N may store and retrieve data from a same set of memories.

In one embodiment, the host processor 108 may configure logical connections across different image processors 102A-102N. For example, the output from an image process operation executed in an image signal processor 202 in the image processor 102A may be inputted into an image signal processor 202 in the image processor 102N through the expansion interfaces 208A-208D of the image processor 102A and the image processor 102N based on point-to-point traversing through a number of port rings of different image signal processors 202. Moreover, in an embodiment, the output from an image process operation executed in an image signal processor 202 in the image processor 102A may be stored in one of the memories 104A-104B. Subsequently, an image signal processor 202 in the image processor 102N may retrieve this stored data for execution of an image process operation therein. Therefore, as described, embodiments of the invention provide the ability to scale the number of image signal processors with small variations to the architecture.

Thus, methods, apparatuses and systems for processor to processor communication in a data driven architecture have been described. Although the invention has been described with reference to specific exemplary embodiments, it will be evident that various modifications and changes may be made to these embodiments without departing from the broader spirit and scope of the invention. For example, while the operations are described in reference to image processing operations, in other embodiments, such operations are applicable to other types of data. Therefore, the specification and drawings are to be regarded in an illustrative rather than a restrictive sense.

What is claimed is:

1. An apparatus comprising:
a first processor that includes a first processor element; and
a second processor that includes a second processor element, wherein the first processor is configured to transmit data to the second processor through a third processor, wherein no processor element within the third processor is configured to perform a process operation on the data as part of the transmission of the data from the first processor to the second processor, wherein the first processor includes a type of hardware accelerator that is not included in the second processor.

2. The apparatus of claim 1, wherein the first processor is not directly connected with the second processor.

3. The apparatus of claim 1, wherein no processor element within the third processor is involved in the transmission of data from the first processor to the second processor through the third processor.

4. The apparatus of claim 1, wherein the first processor, the second processor and the third processor are coupled together in a point-to-point configuration.

5. An apparatus comprising:
a first processor that includes a first processor element that is configured to perform a first data process operation; and
a second processor that includes a second processor element that is configured to perform a second data process operation based on an output from the first data process operation, the first processor to transmit the output from the first data process operation to the second processor based on a logical connection that includes traversal through a port ring of a third processor, wherein a third processor element within the third processor is not configured to perform a data process operation between the first data process operation and the second data process operation, wherein the first processor includes a type of hardware accelerator that is not included in the second processor and wherein the first processor element in the first processor is configured to perform the first data process operation on data streams received into the expansion interface at least simultaneously in part with second data process operation performed by the second processor element in the second processor.

6. The apparatus of claim 5, wherein the first processor, the second processor and the third processor are part of a number of processors that are in a point-to-point configuration.

7. The apparatus of claim 5 further comprising,
an expansion interface to receive data on which the processor element in the first processor is to perform the first data process operation; and
a memory interface unit coupled to a memory that is external to the apparatus, wherein the memory is configured to store an output of the second data process operation.

8. A method comprising:
receiving a stream of data in a first processor having a first processor element;
performing, by the first processor element, image processing operations on at least a part of the stream of data; and
transmitting a result of the image processing operations to a second processor through a third processor having a third processor element, independent of image processing operations by the third processor element, wherein the first processor includes a type of hardware accelerator that is not included in the second processor.

9. The method of claim 8, wherein transmitting the result of the image processing operations to the second processor through the third processor includes transmitting the result of the image processing operations to the second processor through a logical connection that includes transmission through a series of processors including the third processor.

10. The method of claim 8, wherein receiving the stream of data in the first processor having the first processor element includes receiving the stream of data in the first processor having the first processor element at least simultaneously in part with performing, by a second processor element in the second processor, a different image processing operation.

11. A method comprising:
performing, by a hardware accelerator in a first image signal processor within a multi-processor point-to-point configuration, the following operations until receipt of image data from an image scanning operation is complete,
    executing, by a first processor element in the first image signal processor, an image process operation on the image data; and
    transmitting a result of the image process operation to a second image signal processor within the multi-processor point-to-point configuration through a logical connection that includes a number of ports of a number of other different image signal processors within the multi-processor point-to-point configuration, wherein a type of the hardware accelerator is not included in at least one of the number of other different image signal processors.

12. The method of claim 11, wherein transmitting the result of the image process operation to the second image signal processor includes transmitting the result of the image process operation to the second image signal processor through the logical connection, wherein other processing elements in the other different image signal processors do not process the image data prior to processing by a second processor element in the second image signal processor.

13. The method of claim 11, further comprising receiving the image data from a source that is external to the multi-processor point-to-point configuration.

14. A non-transitory computer readable medium that provides instructions, which when executed by a computer, cause said computer to perform operations comprising:
receiving a stream of data in a first processor having a first processor element;
performing, by the first processor element, image processing operations on at least a part of the stream of data; and
transmitting a result of the image processing operations to a second processor through a third processor having a third processor element, independent of image processing operations by the third processor element, wherein the first processor includes a type of hardware accelerator that is not included in the second processor.

15. The non-transitory computer readable medium of claim 14, wherein transmitting the result of the image processing operations to the second processor through the third processor includes transmitting the result of the image processing operations to the second processor through a logical connection that includes transmission through a series of processors including the third processor.

16. The non-transitory computer readable medium of claim 14, wherein receiving the stream of data in the first processor having the first processor element includes receiving the stream of data in the first processor having the first processor element at least simultaneously in part with performing, by a second processor element in the second processor, a different image processing operation.

17. A non-transitory computer readable storage medium that provides instructions, which when executed by a computer, cause said computer to perform operations comprising:
recursively performing, by a hardware accelerator in a first image signal processor within a multi-processor point-to-point configuration, the following operations until receipt of image data from an image scanning operation is complete,
executing, by a first processor element in the first image signal processor, an image process operation on the image data; and
transmitting a result of the image process operation to a second image signal processor within the multi-processor point-to-point configuration through a logical connection that includes a number of ports of a number of other different image signal processors within the multiprocessor point-to-point configuration, wherein a type of the hardware accelerator is not included in at least one of the number of other different image signal processors.

18. The non-transitory computer readable medium of claim 17, wherein transmitting the result of the image process operation to the second image signal processor includes transmitting the result of the image process operation to the second image signal processor through the logical connection, wherein other processing elements in the other different image signal processors do not process the image data prior to processing by a second processor element in the second image signal processor.

19. The non-transitory computer readable medium of claim 17 further comprising receiving the image data from a source that is external to the multi-processor point-to-point configuration.

* * * * *